(12) United States Patent
Toyoda

(10) Patent No.: US 11,445,119 B2
(45) Date of Patent: Sep. 13, 2022

(54) IMAGE CAPTURING CONTROL APPARATUS, IMAGE CAPTURING CONTROL METHOD, AND STORAGE MEDIUM

(71) Applicant: CANON KABUSHIKI KAISHA, Tokyo (JP)

(72) Inventor: Takuya Toyoda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/474,754

(22) Filed: Sep. 14, 2021

(65) Prior Publication Data
US 2022/0094855 A1   Mar. 24, 2022

(30) Foreign Application Priority Data
Sep. 18, 2020   (JP) .............................. JP2020-157729

(51) Int. Cl.
*H04N 5/232*   (2006.01)
*H04N 7/18*    (2006.01)

(52) U.S. Cl.
CPC ..... *H04N 5/23296* (2013.01); *H04N 5/23206* (2013.01); *H04N 5/23299* (2018.08); *H04N 7/185* (2013.01)

(58) Field of Classification Search
CPC ........... H04N 5/23216; H04N 5/23218; H04N 5/23296; H04N 5/23299; H04N 5/23206; H04N 7/185; H04N 7/183
See application file for complete search history.

(56) References Cited

U.S. PATENT DOCUMENTS

| | | | |
|---|---|---|---|
| 6,281,930 B1* | 8/2001 | Parker ................ | H04N 5/23206 348/169 |
| 2020/0092460 A1* | 3/2020 | Nadeau ............ | G08B 13/19682 |
| 2021/0203836 A1* | 7/2021 | Qin ......................... | G06F 3/041 |
| 2021/0274100 A1* | 9/2021 | Meng ................. | H04N 5/23299 |
| 2022/0109794 A1* | 4/2022 | Takahashi ............ | H04N 5/2224 |

FOREIGN PATENT DOCUMENTS

| | | | | |
|---|---|---|---|---|
| JP | 2007158680 A | | 6/2007 | |
| JP | 2014093691 A | * | 5/2014 | ......... H04N 5/23216 |

* cited by examiner

*Primary Examiner* — Chiawei Chen
(74) *Attorney, Agent, or Firm* — Canon U.S.A., Inc., IP Division

(57) ABSTRACT

An image capturing control apparatus is provided and detects a first target subject and a second target subject, converts intra-angle-of-view coordinates of each of the first and second target subjects into pan and tilt coordinate values, store the pan coordinate value and the tilt coordinate value of each of the first and the second target subject, determine an angle of view so as to include the first and second target subjects based on the stored pan and tilt coordinate values, and control an angle of view of the image capturing apparatus based on the determined angle of view.

14 Claims, 25 Drawing Sheets

FIG.16

| TIME | PT COORDINATE VALUES OF RECTANGLE REPRESENTING HUMAN BODY (UPPER LEFT COORDINATES, WIDTH, AND HEIGHT) |
|---|---|
| $t_1$ | $(\theta_1, \phi_1), \theta_{d1}, \phi_{d1}$ |
| $t_2$ | $(\theta_2, \phi_2), \theta_{d2}, \phi_{d2}$ |
| ... | ... |
| $t_n$ | $(\theta_n, \phi_n), \theta_{dn}, \phi_{dn}$ |
| $t_{n+1}$ | $(\theta_{n+1}, \phi_{n+1}), \theta_{d(n+1)}, \phi_{d(n+1)}$ |
| ... | ... |
| $t_{2n}$ | $(\theta_{2n}, \phi_{2n}), \theta_{d2n}, \phi_{d2n}$ |
| ... | ... |

| OBJECT | PT COORDINATE VALUES (UPPER LEFT COORDINATES, WIDTH, AND HEIGHT) |
|---|---|
| obj1 | $(\theta_{o1}, \phi_{o1}), \theta_{do1}, \phi_{do1}$ |
| obj2 | $(\theta_{o2}, \phi_{o2}), \theta_{do2}, \phi_{do2}$ |

IMAGE CAPTURING CONTROL APPARATUS, IMAGE CAPTURING CONTROL METHOD, AND STORAGE MEDIUM

BACKGROUND

Field

Aspects of the present disclosure generally relate to a control technique for an apparatus which captures an image.

Description of the Related Art

Recently, there has been a growing need for an image capturing apparatus which automatically performs image capturing of, for example, a scene in which an instructor gives a lecture. In the case of automatically performing and displaying a lecture scene, such control is performed as to, in normal times, display a close-up image of the instructor, who is a target subject, and, when the instructor has pointed at, for example, a blackboard, display an image including two target subjects, i.e., the instructor and the pointed-out region on the blackboard. Japanese Patent Application Laid-Open No. 2007-158680 discusses a technique to perform image capturing of, for example, a lecture platform at a previously-determined standard angle of view, which is a wide field of view, obtain the center-of-mass coordinates of the instructor and the center-of-mass coordinates of the pointed-out region from the coordinates included in the standard angle of view, and calculate an angle of view including two target subjects, i.e., the instructor and the pointed-out region, based on the obtained center-of-mass coordinates. Moreover, Japanese Patent Application Laid-Open No. 2007-158680 discusses a technique to clip an image having an angle of view including the two target subjects from a captured image having the standard angle of view by using digital PTZ processing. Additionally, Japanese Patent Application Laid-Open No. 2007-158680 discusses a technique to prepare a camera for the standard angle of view and a camera for tracking and perform PTZ control of the angle of view of the camera for tracking according to an angle of view including the two target subjects. Furthermore, the term PTZ is an abbreviation for pan (P), tilt (T), and zoom (Z).

However, in the technique discussed in Japanese Patent Application Laid-Open No. 2007-158680, it is possible to acquire only an image included in the previously-determined standard angle of view. Particularly, in a case where a whiteboard located outside the standard angle of view has been pointed by, for example, the instructor, since there are no coordinates included in the standard angle of view corresponding to the whiteboard, it is not possible to calculate an angle of view including the instructor and the whiteboard. Thus, in the technique discussed in Japanese Patent Application Laid-Open No. 2007-158680, since it is impossible to calculate an angle of view including a target subject located inside the previously-determined angle of view and another target subject simultaneously located outside the previously-determined angle of view, it is not possible to acquire an image including such two target subjects.

SUMMARY

Aspects of the present disclosure are generally directed to enabling acquiring an angle of view including a target subject located inside a previously-determined angle of view and a target subject simultaneously located outside the previously-determined angle of view, thus obtaining an image including such two target subjects.

According to an aspect of the present disclosure, an image capturing control apparatus comprising a computer executing instructions that, when executed by the computer, cause the computer to detect a first target subject from an image captured by an image capturing unit in a state of a first angle of view of the image capturing unit, detect a second target subject from an image captured by the image capturing unit in a state of a second angle of view of the image capturing unit, convert intra-angle-of-view coordinates of each of the first target subject in the first angle of view and the second target subject in the second angle of view into a pan coordinate value and a tilt coordinate value, store the pan coordinate value and the tilt coordinate value of each of the first target subject and the second target subject, determine an angle of view so as to include the first target subject and the second target subject based on the stored pan coordinate value and the stored tilt coordinate value of each of the first target subject and the second target subject, even if a current angle of view of the imaging unit does not include at least one of the first target subject and the second target subject, and control an angle of view of the image capturing unit based on the determined angle of view.

Further features of the present disclosure will become apparent from the following description of exemplary embodiments with reference to the attached drawings.

BRIEF DESCRIPTION OF THE DRAWINGS

FIG. 16 is a diagram representing PT coordinate values of an object and PT coordinate values of a human body.

DESCRIPTION OF THE EMBODIMENTS

Figure 1:
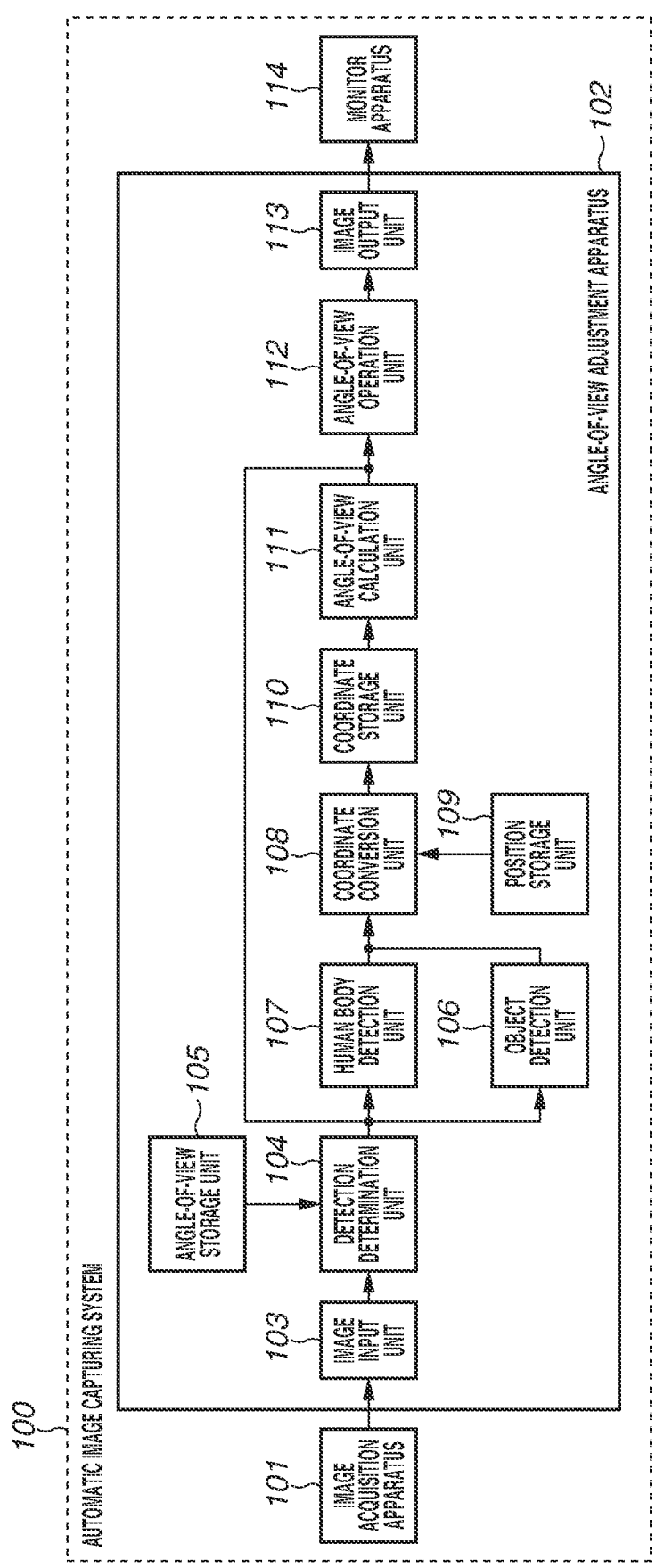
FIG. 1 is a block configuration diagram of an automatic image capturing system according to a first exemplary embodiment.

Various exemplary embodiments, features, and aspects of the disclosure will be described in detail below with reference to the drawings. Furthermore, configurations illustrated in the following exemplary embodiments are merely examples, and the present disclosure should not be construed to be limited to the illustrated configurations. Moreover, in the following exemplary embodiments, the same configurations and processing operations are assigned the respective same reference characters for description.

A configuration example of an image capturing control apparatus according to a first exemplary embodiment is described with reference to FIG. 1. FIG. 1 is a block diagram illustrating a functional configuration of an automatic image capturing system 100 including an angle-of-view adjustment apparatus 102, which is an image capturing control apparatus according to the first exemplary embodiment. The automatic image capturing system 100 is configured to include an image acquisition apparatus 101, the angle-of-view adjustment apparatus 102, and a monitor apparatus 114. Furthermore, the angle-of-view adjustment apparatus 102 and the monitor apparatus 114 are interconnected via a video interface.

The image acquisition apparatus 101 is configured to include an image capturing apparatus, such as a camera, which performs image capturing of a subject and surroundings thereof to generate a captured image. The image capturing apparatus includes a zoom optical system, and has a configuration capable of adjusting the zoom magnification in response to a zoom value being controlled. Moreover, the image capturing apparatus includes a camera platform, so that the image capturing apparatus is configured to be able to be adjusted with respect to a pan direction in response to a pan value for the camera platform being controlled and is also configured to be able to be adjusted with respect to a tilt direction in response to a tilt value for the camera platform being controlled. Accordingly, the image capturing apparatus is configured to be able to adjust an angle of view in response to the pan value, the tilt value, and the zoom value being controlled. The image acquisition apparatus 101 outputs image information captured by the image capturing apparatus to the angle-of-view adjustment apparatus 102.

The angle-of-view adjustment apparatus 102 has a function of the image capturing control apparatus, which adjusts the angle of view of the image capturing apparatus of the image acquisition apparatus 101. In the first exemplary embodiment, the angle-of-view adjustment apparatus 102 detects, from an image captured by the image capturing apparatus of the image acquisition apparatus 101 (hereinafter referred to as a "camera"), for example, a human body, which is a first target subject, and an object, which is a second target subject. For example, in the case of a use application of automatically performing image capturing of a scene in which an instructor is giving a lecture, the human body, which is the first target subject, is assumed to be the instructor, who is giving a lecture, and the object, which is the second target subject, is assumed to be, for example, a blackboard or whiteboard which is being used for the lecture. The angle-of-view adjustment apparatus 102 previously converts each of an intra-angle-of-view coordinate value of the human body obtained by setting the human body in an angle of view and an intra-angle-of-view coordinate value of the object obtained by setting the object in the angle of view into pan (P) and tilt (T) coordinate values (a pan coordinate value and a tilt coordinate value) and stores the PT coordinate values. After that, even in a case where the human body lies inside the angle of view and, simultaneously, the object lies outside the angle of view, the angle-of-view adjustment apparatus 102 performs angle-of-view calculation using the stored PT coordinate values to obtain an angle of view in which the human body and the object are set, and adjusts the angle of view of the camera to the obtained angle of view. Then, a captured image acquired after the angle of view is adjusted by the angle-of-view adjustment apparatus 102 is output to and displayed on the monitor apparatus 114.

Upon receiving image information as an input from the image acquisition apparatus 101, the angle-of-view adjustment apparatus 102 determines whether an object which is to be set in an angle of view as a target subject has been detected. In a case where an object serving as a target subject has not been detected, the angle-of-view adjustment apparatus 102 adjusts the angle of view of the camera with use of a preset function, and performs object detection using an image obtained by performing image capturing of the object serving as a target subject. In a case where an object serving as a target subject has been detected, the angle-of-view adjustment apparatus 102 converts an intra-angle-of-view coordinate value of the object obtained at that time into PT coordinate values using pan, tilt, and zoom (PTZ) values of the camera, and stores the PT coordinate values. Moreover, the angle-of-view adjustment apparatus 102 detects a human body serving as a target subject from within the captured image obtained by the camera, and, as with the case of the above-mentioned object serving as a target subject, converts an intra-angle-of-view coordinate value of the human body into PT coordinate values using PTZ values of the camera and stores the PT coordinate values. The angle-of-view adjustment apparatus 102 calculates, based on the PT coordinate values of the human body and the object obtained and stored in the above-mentioned way, an angle of view in which to set the human body, which lies inside the angle of view at the time of image capturing performed by the camera, and the object, which lies outside the angle of view at that time, and performs angle-of-view adjustment according to the calculated angle of view. After that, the angle-ofview adjustment apparatus 102 outputs image information obtained after the angle-of-view adjustment is performed to the monitor apparatus 114.

The angle-of-view adjustment apparatus 102 includes an image input unit 103, a detection determination unit 104, an angle-of-view storage unit 105, an object detection unit 106, a human body detection unit 107, a coordinate conversion unit 108, a position storage unit 109, a coordinate storage unit 110, an angle-of-view calculation unit 111, an angle-of-view operation unit 112, and an image output unit 113. The image input unit 103 receives image information as an input from the image acquisition apparatus 101, and outputs the input image information to the detection determination unit 104.

The detection determination unit 104 determines whether, in the current angle of view of the camera, an object serving as a target subject which is to be set in the angle of view is being detected. In a case where no object serving as the target subject is being detected in the current angle of view of the camera, the detection determination unit 104 outputs the image information input from the image input unit 103 to the object detection unit 106. On the other hand, in a case where an object serving as the target subject is being detected in the current angle of view of the camera, the detection determination unit 104 inquires of the angle-of-view storage unit 105 whether there is a preset angle of view that is not yet used.

The angle-of-view storage unit 105 previously stores information about a plurality of preset angles of view input by, for example, a user operation and information indicating whether each preset angle of view is already used, and outputs such pieces of information in response to an acquisition request received from the detection determination unit 104.

Figure 2:
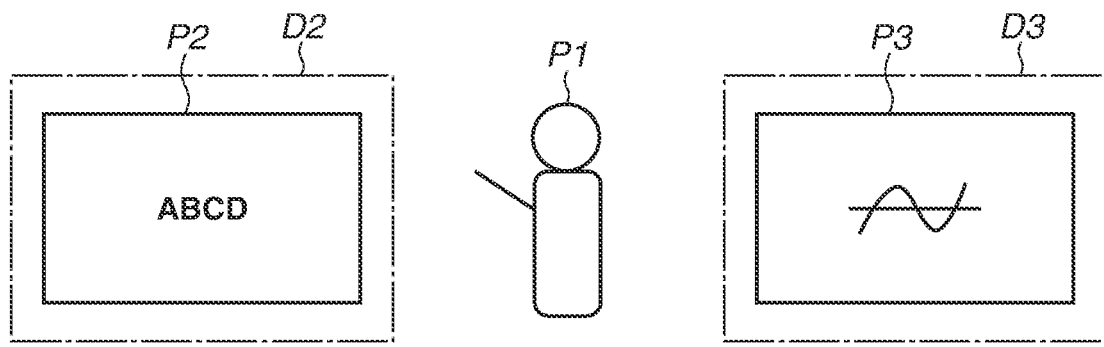
FIG. 2 is a diagram illustrating target subjects which are to be set in an angle of view.

Preset angles are described with reference to FIG. 2. FIG. 2 is a diagram illustrating a human body P1, which serves as a target subject, and objects P2 and P3, each of which serves as another target subject which is to be set in an angle of view. A range indicated by a dashed-dotted line in FIG. 2 represents a preset angle of view, and an angle of view D2 represents a preset angle of view in which the object P2 serving as a target subject is set and an angle of view D3 represents a preset angle of view in which the object P3 serving as a target subject is set. In this way, there is a plurality of preset angles of view, and such a plurality of preset angles of view includes a plurality of respective different preset positions and a plurality of image capturing ranges associated with the respective preset positions.

In a case where there is no preset angle of view that is not yet used from among pieces of information stored in the angle-of-view storage unit 105, the detection determination unit 104 outputs the image information input from the image input unit 103 to the human body detection unit 107. On the other hand, in a case where there is a preset angle of view that is not yet used from among pieces of information stored in the angle-of-view storage unit 105, the detection determination unit 104 outputs information about the preset angle of view to the angle-of-view operation unit 112 described below. Thus, the detection determination unit 104 outputs information about the preset angle of view to the angle-of-view operation unit 112 to set the angle of view of the camera to the preset angle of view.

The object detection unit 106 performs object detection processing for detecting an object included in an image from the image information input from the detection determination unit 104. The object detection processing can be performed by using a high-accuracy and high-speed technique that is based on deep learning. Examples of the object detection processing that is based on deep learning include Faster Region Based Convolutional Neural Network (Faster R-CNN), You Only Look Once (YOLO), Single Shot MultiBox Detector (SSD), and Masked Region Based Convolutional Neural Network (Masked R-CNN). The object detection unit 106 is assumed to use any one of these object detection processing techniques, but is not limited to the use of those. Faster R-CNN, YOLO, SSD, and Masked R-CNN are known techniques, and, therefore, the detailed description thereof is omitted. Then, when having been able to detect an object from within an image, the object detection unit 106 outputs an intra-angle-of-view coordinate value and image information about the detected object to the coordinate conversion unit 108.

The human body detection unit 107 performs human body detection processing for detecting a human body included in an image from the image information input from the detection determination unit 104. The human body detection processing can be performed by using any method as long as it is capable of detecting a human body, such as a template matching method or a semantic segmentation method. The template matching method and the semantic segmentation method are known techniques, and, therefore, the detailed description thereof is omitted. When having been able to detect a human body from within an image, the human body detection unit 107 outputs an intra-angle-of-view coordinate value and image information about the detected human body to the coordinate conversion unit 108. In the first exemplary embodiment, the human body detection unit 107 is assumed to output coordinate values of four vertices of a rectangle (hereinafter referred to as a "detection rectangle") encompassing the human body detected from within the image, as a coordinate value of the detected human body.

The coordinate conversion unit 108 receives the coordinate value and image information about the object input from the object detection unit 106 and also receives the coordinate value and image information about the human body input from the human body detection unit 107. Moreover, the position storage unit 109 previously stores the current PTZ values of the camera, and outputs information about the current PTZ values to the coordinate conversion unit 108. The coordinate conversion unit 108 converts the intra-angle-of-view coordinate values of the object and the human body into PT coordinate values based on the coordinate value and image information about the object, the coordinate value and image information about the human body, and the information about the current PTZ values of the camera. Then, the coordinate conversion unit 108 outputs the PT coordinate values and image information about the object and the human body to the coordinate storage unit 110.

Figure 3:
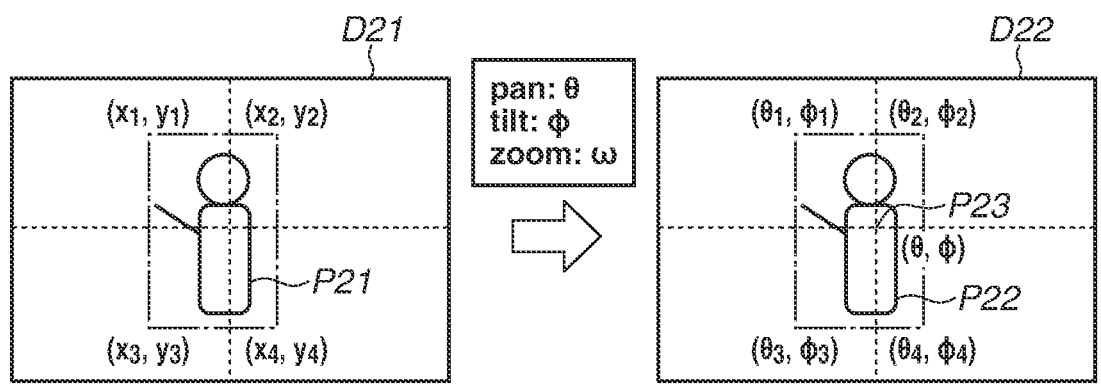
FIG. 3 is an explanatory diagram of processing for converting intra-angle-of-view coordinates into pan and tilt (PT) coordinate values.

The manner of PT coordinate conversion processing which the coordinate conversion unit 108 performs to convert the intra-angle-of-view coordinate values of the object and the human body into PT coordinate values is described with reference to FIG. 3. In FIG. 3, an image D21 is an image obtained by representing coordinates of the human body detected by the human body detection unit 107 with intra-angle-of-view coordinates. Moreover, an image D22 is an image obtained by representing the intra-angle-of-view coordinates, which represent the human body in the image D21, with PT coordinate values. Thus, a human body P21 included in the image D21 and a human body P22 included in the image D22 are the same person obtained at the same time. A rectangle indicated by a dashed-dotted line encompassing the human body P21 in the image D21 represents a detection rectangle indicating the human body detected by the human body detection unit 107. In the image D21, the intra-angle-of-view coordinates of the detection rectangle of the human body P21 are assumed to be represented by four coordinates of (x1, y1), (x2, y2), (x3, y3), and (x4, y4) in order of an upper-left vertex, an upper-right vertex, a lower-left vertex, and a lower-right vertex. Moreover, if the pan value, tilt value, and zoom value of the camera obtained at the time of performing image capturing of an image in which the human body has been detected are denoted by θ, Φ, and ω, respectively, the PTZ values are assumed to be denoted by (θ, Φ, ω). The coordinate conversion unit 108 converts the intra-angle-of-view coordinates of the human body and the object into PT coordinate values with use of the intra-angle-of-view coordinate values and the PTZ values.

Conversion processing for converting the intra-angle-of-view coordinates into PT coordinate values can be implemented by using, for example, any one of techniques of converting plane coordinates into spherical coordinates, calculating coordinates projected onto a given plane perpendicular to the optical axis of the camera, and converting coordinates on a projection plane into rotational angles such as a pan angle and a tilt angle. These techniques are known techniques, and, therefore, the detailed description thereof is omitted. Moreover, the conversion processing using any of these techniques is merely an example, and can be performed by using any method as long as it is a method capable of converting intra-angle-of-view coordinates into PT coordinate values. With the intra-angle-of-view coordinates of the human body P21 taken as an example, the PT coordinate values obtained by conversion are represented by four sets of coordinates of (θ1, Φ1), (θ2, Φ2), (θ3, Φ3), and (θ4, Φ4) in order of an upper-left vertex, an upper-right vertex, a lower-left vertex, and a lower-right vertex of the rectangle for the human body P22 in the image D22. Furthermore, the coordinates (θ, Φ) in the image D22 represent PT coordinate values of an angle-of-view center P23.

The coordinate storage unit 110 stores the PT coordinate values and image information about the human body and the object input from the coordinate conversion unit 108, and outputs the stored PT coordinate values and image information to the angle-of-view calculation unit 111. The angle-of-view calculation unit 111 calculates an angle of view of the camera which enables setting therein a human body lying inside the current angle of view of the camera and an object lying outside the current angle of view of the camera, based on the PT coordinate values and image information about the human body and the object read out from the coordinate storage unit 110. In the case of the first exemplary embodiment, the angle-of-view calculation unit 111 calculates PTZ values used for determining an angle of view of the camera which enables setting therein a human body lying inside the current angle of view and an object lying outside the current angle of view.

Figure 4:
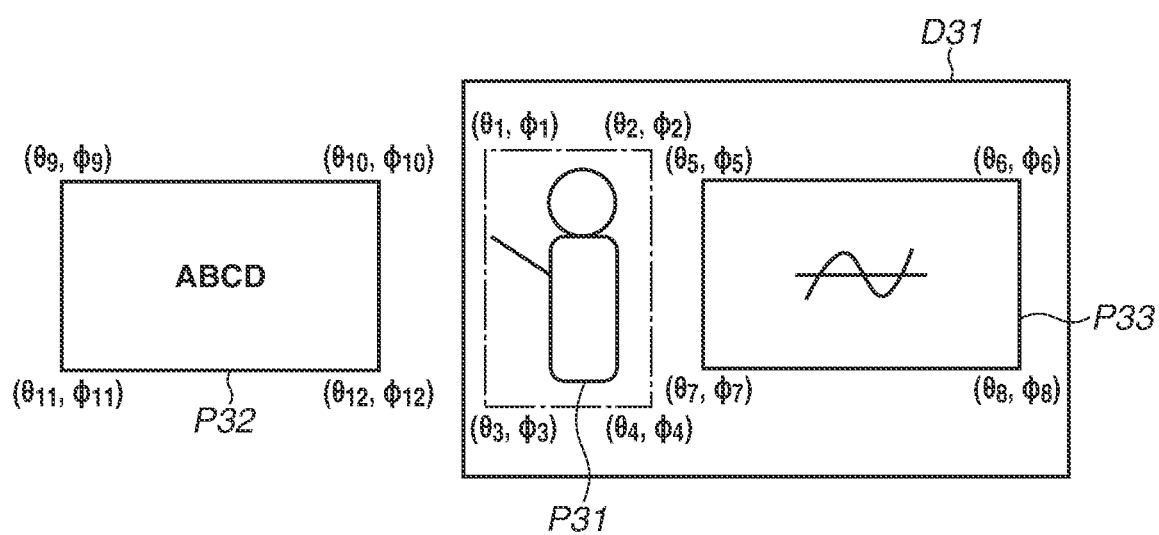
FIG. 4 is a diagram used to explain a current angle of view.

The manner in which the angle-of-view calculation unit 111 calculates PTZ values used for determining an angle of view of the camera which enables setting therein a human body lying inside the current angle of view of the camera and an object lying outside the current angle of view of the camera is described with reference to FIG. 4 and FIG. 5. In FIG. 4, an angle of view D31 represents the current angle of view of the camera. A human body P31 is assumed to correspond to the human body P1 illustrated in FIG. 2 as an example, and, moreover, an object P32 is assumed to correspond to the object P2 illustrated in FIG. 2 and an object P33 is assumed to correspond to the object P3 illustrated in FIG. 2. PT coordinate values of the rectangle for the human body P31 are assumed to be represented by four coordinate values of (θ1, Φ1), (θ2, Φ2), (θ3, Φ3), and (θ4, Φ4) in order of an upper-left vertex, an upper-right vertex, a lower-left vertex, and a lower-right vertex of the rectangle. Moreover, PT coordinate values of the rectangular object P33 are assumed to be represented by four coordinate values of (θ5, Φ5), (θ6, Φ6), (θ7, Φ7), and (θ8, Φ18) in order of an upper-left vertex, an upper-right vertex, a lower-left vertex, and a lower-right vertex of the rectangle. Likewise, PT coordinate values of the rectangular object P32 are assumed to be represented by four coordinate values of (θ9, Φ19), (θ10, θ10), (θ11, Φ11), and (θ12, Φ12) in order of an upper-left vertex, an upper-right vertex, a lower-left vertex, and a lower-right vertex of the rectangle. The current angle of view D31 of the camera illustrated in FIG. 4 is assumed to be an angle of view in which the human body P31 and the object P33 are set, and the object P32 is assumed to lie outside the current angle of view D31 of the camera. However, since the PT coordinate values of the object P32 are previously acquired by the PT coordinate conversion processing using a preset angle of view and then stored in the coordinate storage unit 110, the angle-of-view calculation unit 111 is able to acquire the PT coordinate values of the object P32 from the coordinate storage unit 110.

Figure 5:
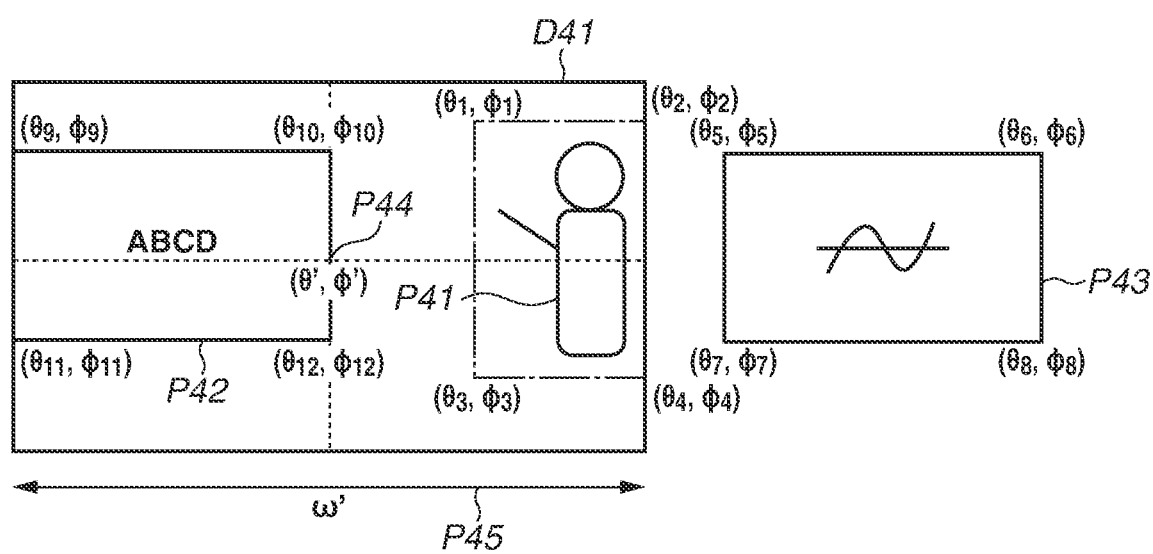
FIG. 5 is an explanatory diagram of angle-of-view control according to the first exemplary embodiment.

FIG. 5 is a diagram used to explain the manner in which the angle-of-view calculation unit 111 calculates an angle of view in which to set the human body P31 and the object P32, based on the PT coordinate values of the human body P31 and the object P32. First, the method of determining an angle of view by the angle-of-view calculation unit 111 is described. The angle of view is uniquely determined by a center point, a horizontal angle-of-view value, and a vertical angle-of-view value being determined. Moreover, the horizontal angle-of-view value and the vertical angle-of-view value change depending on the focal length of the camera, and the focal length of a camera including a zoom optical system as in the first exemplary embodiment is determined by the zoom magnification. Moreover, since, usually, the image size is determined according to the aspect ratio of an image, if one of the horizontal angle-of-view value and the vertical angle-of-view value is specified, the other thereof is specified. For these reasons, in the first exemplary embodiment, the angle-of-view calculation unit 111 is assumed to obtain an angle of view by performing calculation of the center point and the horizontal angle-of-view value corresponding to the zoom magnification.

In FIG. 5, a human body P41 is assumed to correspond to the human body P31 illustrated in FIG. 4, and, likewise, an object P42 is assumed to correspond to the object P32 illustrated in FIG. 4 and an object P43 is assumed to correspond to the object P33 illustrated in FIG. 4. Therefore, PT coordinate values of the human body P41, the object P42, and the object P43 illustrated in FIG. 5 are assumed to be equal to the respective PT coordinate values of the human body P31, the object P32, and the object P33 illustrated in FIG. 4. Moreover, the center of an angle of view D41 in which to set the human body P41 and the object P42 is denoted by P44, the PT coordinate values of the center P44 are denoted by (θ', Φ'), the horizontal angle-of view is denoted by P45, and the horizontal angle-of-view value is denoted by ω'. The PT coordinate values (θ', Φ') of the center P44 and the horizontal angle-of-view value ω' are able to be calculated in the following way.

The horizontal angle-of-view value ω' can be calculated as a difference value in P coordinate value (pan coordinate value) between the human body P41 and the object P42, as expressed by formula (1).

$$\omega' = \max(\theta 1, \theta 2, \theta 9, \theta 10) - \min(\theta 1, \theta 2, \theta 9, \theta 10) \quad (1)$$

Furthermore, in formula (1), max( ) represents acquiring the maximum value of values in parentheses, and min( ) represents the minimum value of values in parentheses.

Moreover, the P coordinate value θ' of the center P44 of the angle of view can be calculated as an average value of P coordinate values of the human body P41 and the object P42, as expressed by formula (2).

$$\theta' = (\max(\theta 1, \theta 2, \theta 9, \theta 10) + \min(\theta 1, \theta 2, \theta 9, \theta 10))/2 \quad (2)$$

Moreover, the T coordinate value (tilt coordinate value) Φ' of the center P44 of the angle of view can be calculated as an average value of T coordinate values of the human body P41 and the object P42, as expressed by formula (3).

$$\Phi' = (\max(\Phi 1, \Phi 2, \Phi 9, \Phi 10) + \min(\Phi 1, \Phi 2, \Phi 9, \Phi 10))/2 \quad (3)$$

The angle-of-view calculation unit 111 calculates the angle of view D41 in the above-described way, and outputs the calculated angle of view D41 and image information to the angle-of-view operation unit 112. In the case of the first exemplary embodiment, the angle-of-view calculation unit 111 can be configured to perform, in addition to angle-of-view acquisition processing using the above-described calculation, for example, angle-of-view acquisition processing for selecting an angle of view from within a table in which a plurality of angles of view is previously prepared.

The angle-of-view operation unit 112 operates an angle of view of the camera, i.e., performs angle-of-view adjustment control of the camera, with use of the angle of view and image information input from the angle-of-view calculation unit 111 or the preset angle of view and image information input from the detection determination unit 104. After that, image information subjected to angle-of-view adjustment is output from the angle-of-view operation unit 112 to the image output unit 113. The image output unit 113 outputs the image information input from the angle-of-view operation unit 112 to the monitor apparatus 114. With this processing, the monitor apparatus 114 displays, on a monitor thereof, a video image that is based on the image information input from the image output unit 113.

Figure 6:
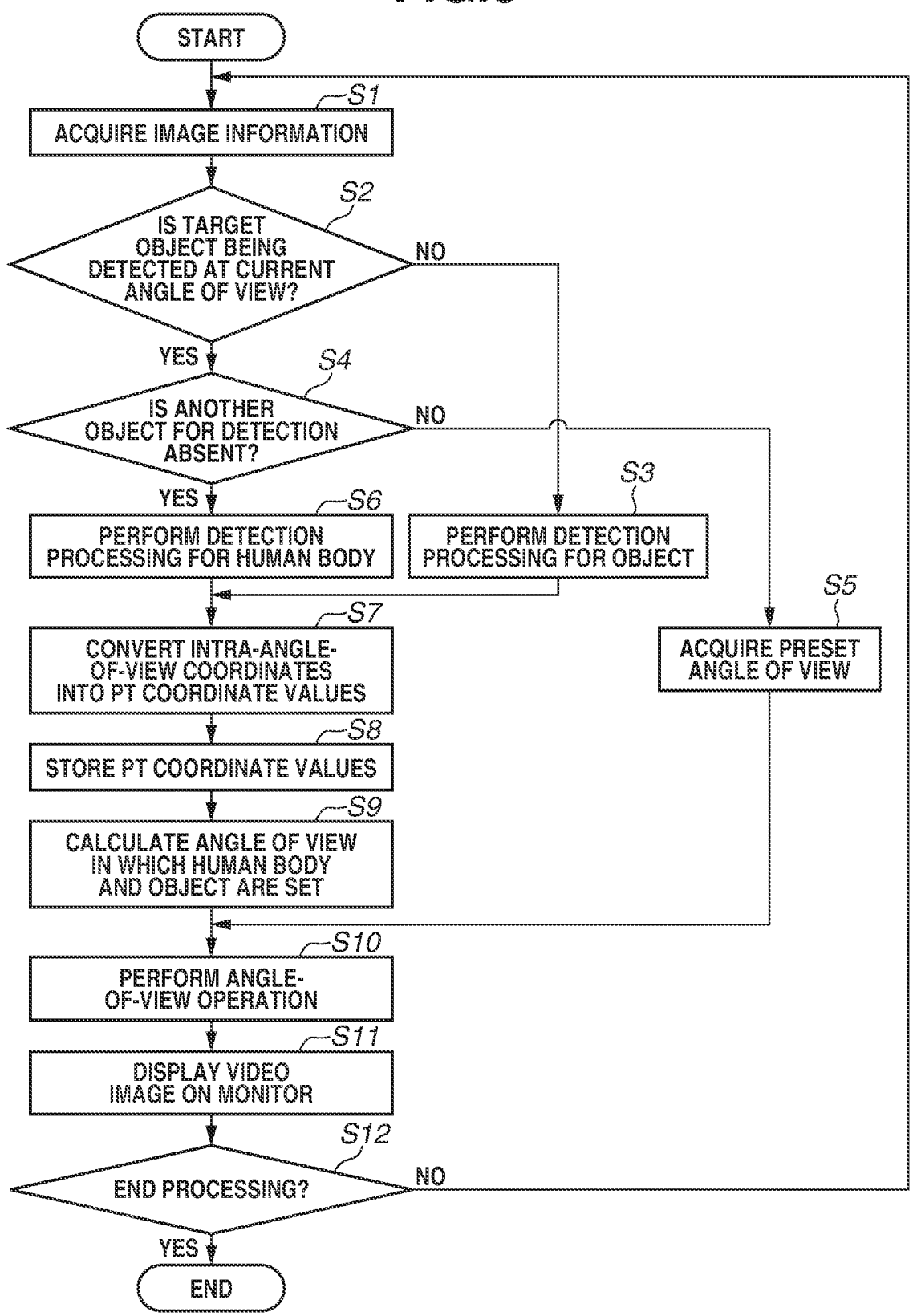
FIG. 6 is a flowchart of angle-of-view adjustment processing according to the first exemplary embodiment.

FIG. 6 is a flowchart particularly illustrating the flow of angle-of-view adjustment processing which the angle-of-view adjustment apparatus 102 performs out of processing operations related to the automatic image capturing system 100 according to the first exemplary embodiment. Upon receiving an instruction for startup issued by a user operation, the automatic image capturing system 100 starts processing for automatic image capturing. First, in step S1, the image input unit 103 of the angle-of-view adjustment apparatus 102 acquires image information from the image acquisition apparatus 101. Then, the angle-of-view adjustment apparatus 102 advances the processing to step S2.

In step S2, the detection determination unit 104 determines whether a target object which is to be set in the angle of view of the camera is being detected, i.e., there is a target object in an image, with use of the image information input from the image input unit 103. The target object which the detection determination unit 104 determines in step S2 is a target subject being a human body or an object. If the result of determination in step S2 is true (YES in step S2), i.e., if it is determined that a target object which is to be set in the angle of view is being detected, the detection determination unit 104 advances the processing to step S4. On the other hand, if the result of determination in step S2 is false (NO in step S2), i.e., if it is determined that no target object which is to be set in the angle of view is being detected, the detection determination unit 104 outputs the image information to the object detection unit 106, and the angle-of-view adjustment apparatus 102 advances the processing to step S3.

In step S3, the object detection unit 106 performs detection processing for an object serving as, for example, a second target subject, with use of the image information input from the detection determination unit 104, and outputs coordinates of the detected object and the image information to the coordinate conversion unit 108. Then, the angle-of-view adjustment apparatus 102 advances the processing to step S7.

In step S4, the detection determination unit 104 determines whether another object serving as a second target subject targeted for detection is absent, with use of information indicating whether a preset angle of view acquired from the angle-of-view storage unit 105 has been used. If the result of determination in step S4 is true (YES in step S4), i.e., if it is determined that another object targeted for detection is absent, the detection determination unit 104 outputs the image information to the human body detection unit 107. Then, the angle-of-view adjustment apparatus 102 advances the processing to step S6. On the other hand, if the result of determination in step S4 is false (NO in step S4), i.e., if it is determined that another object targeted for detection is present, the detection determination unit 104 advances the processing to step S5.

In step S5, which follows step S4, the detection determination unit 104 acquires information about a preset angle of view from the angle-of-view storage unit 105. Then, the angle-of-view adjustment apparatus 102 advances the processing to step S10. In a case where the processing has proceeded from step S5 to step S10, in step S10, the angle-of-view operation unit 112 performs, based on the information about a preset angle of view, an angle-of-view operation in such a manner that an object is set in the preset angle of view. Then, the angle-of-view adjustment apparatus 102 advances the processing to step S11.

In step S11, the image output unit 113 outputs, to the monitor apparatus 114, the image information input from the angle-of-view operation unit 112. This causes a video image that is based on the image information to be displayed on the monitor apparatus 114. Then, the angle-of-view adjustment apparatus 102 advances the processing to step S12.

In step S12, the angle-of-view adjustment apparatus 102 determines whether a stopping operation for the automatic image capturing processing has been performed by an automatic image capturing system on/off switch (not illustrated) being operated by a user operation. If the result of determination in step S12 is false (NO in step S12), i.e., if it is determined that a switch operation for turning-off has not been performed, the angle-of-view adjustment apparatus 102 returns the processing to step S1. On the other hand, if the result of determination in step S12 is true (YES in step S12), i.e., if it is determined that a switch operation for turning-off has been performed, the angle-of-view adjustment apparatus 102 ends the processing illustrated in the flowchart of FIG. 6. In a case where, as mentioned above, the processing has proceeded from step S4 to step S5, then, has returned to step S1 via the processing in steps S10, S11, and S12, and, then, has proceeded from step S2 to step S3, the object detection unit 106 performs object detection processing with use of image information acquired with the preset angle of view. Then, the object detection unit 106 outputs coordinates of an object detected inside the preset angle of view and image information to the coordinate conversion unit 108.

Moreover, in a case where the processing has proceeded from step S4 to step S6, the human body detection unit 107 performs detection processing for a human body with use of the image information acquired from the detection determination unit 104, and outputs coordinates of the detected human body and the image information to the coordinate conversion unit 108. Then, the angle-of-view adjustment apparatus 102 advances the processing to step S7.

In a case where the processing has proceeded from step S3 to step S7, in step S7, the coordinate conversion unit 108 converts, based on the coordinates of the object and the image information obtained from the object detection unit 106 and the current PTZ values of the camera obtained from the position storage unit 109, intra-angle-of-view coordinates of the object into PT coordinate values. Moreover, in a case where the processing has proceeded from step S6 to step S7, in step S7, the coordinate conversion unit 108 converts, based on the coordinates of the human body and the image information obtained from the human body detection unit 107 and the current PTZ values of the camera obtained from the position storage unit 109, intra-angle-of-view coordinates of the human body into PT coordinate values. Then, the coordinate conversion unit 108 outputs the PT coordinate values obtained by conversion to the coordinate storage unit 110. Then, the angle-of-view adjustment apparatus 102 advances the processing to step S8.

In step S8, the coordinate storage unit 110 stores the PT coordinate values acquired from the coordinate conversion unit 108. Thus, the PT coordinate values of the human body and the object are stored in the coordinate storage unit 110. Then, the angle-of-view adjustment apparatus 102 advances the processing to step S9. In step S9, the angle-of-view calculation unit 111 calculates an angle of view in which the human body lying inside the angle of view and the object lying outside the angle of view at that time are set, from the PT coordinate values of the human body and the object acquired from the coordinate storage unit 110. Thus, the angle-of-view calculation unit 111 calculates an angle of view in which the human body lying inside the angle of view and the object lying outside the angle of view before an angle-of-view operation is performed by the angle-of-view operation unit 112 are set. Then, the angle-of-view calculation unit 111 outputs information about the calculated angle of view to the angle-of-view operation unit 112. After that, the angle-of-view adjustment apparatus 102 advances the processing to step S10.

In step S10, the angle-of-view operation unit 112 performs an angle-of-view operation that is based on the information about the angle of view acquired from the angle-of-view calculation unit 111. Thus, such an angle-of-view operation as to set the human body and the object in the angle of view is performed by the angle-of-view operation unit 112. Then, the angle-of-view adjustment apparatus 102 advances the processing to step S11.

In step S11, the image output unit 113 outputs the image information input from the angle-of-view operation unit 112 to the monitor apparatus 114, so that a video image that is based on the image information is displayed on the monitor apparatus 114. After that, in step S12, the angle-of-view adjustment apparatus 102 determines whether the stopping operation has been performed by the automatic image capturing system on/off switch being operated. Then, if the result of determination in step S12 is false (NO in step S12), the angle-of-view adjustment apparatus 102 returns the processing to step S1, and, if the result of determination in step S12 is true (YES in step S12), the angle-of-view adjustment apparatus 102 ends the processing illustrated in the flowchart of FIG. 6.

The angle-of-view adjustment apparatus 102 in the first exemplary embodiment previously converts intra-angle-of-view coordinates obtained by performing object detection using, for example, a preset angle of view into PT coordinate values and stores the PT coordinate values, and then calculates an angle of view in which to set a human body lying inside an angle of view and an object lying outside the angle of view at that time, with use of the stored PT coordinate values. Thus, in the first exemplary embodiment, in a case where an object which is to be set in the current angle of view of the camera lies outside the current angle of view, calculating an angle of view in which to set a human body lying inside the angle of view and the object lying outside the angle of view and performing angle-of-view adjustment enables acquiring an image encompassing the human body and the object. With this, according to the first exemplary embodiment, in an automatic image capturing system which automatically performs image capturing of, for example, a scene in which an instructor gives a lesson, it becomes possible to continue performing image capturing with the instructor and an object set in an angle of view thereof.

Figure 7:
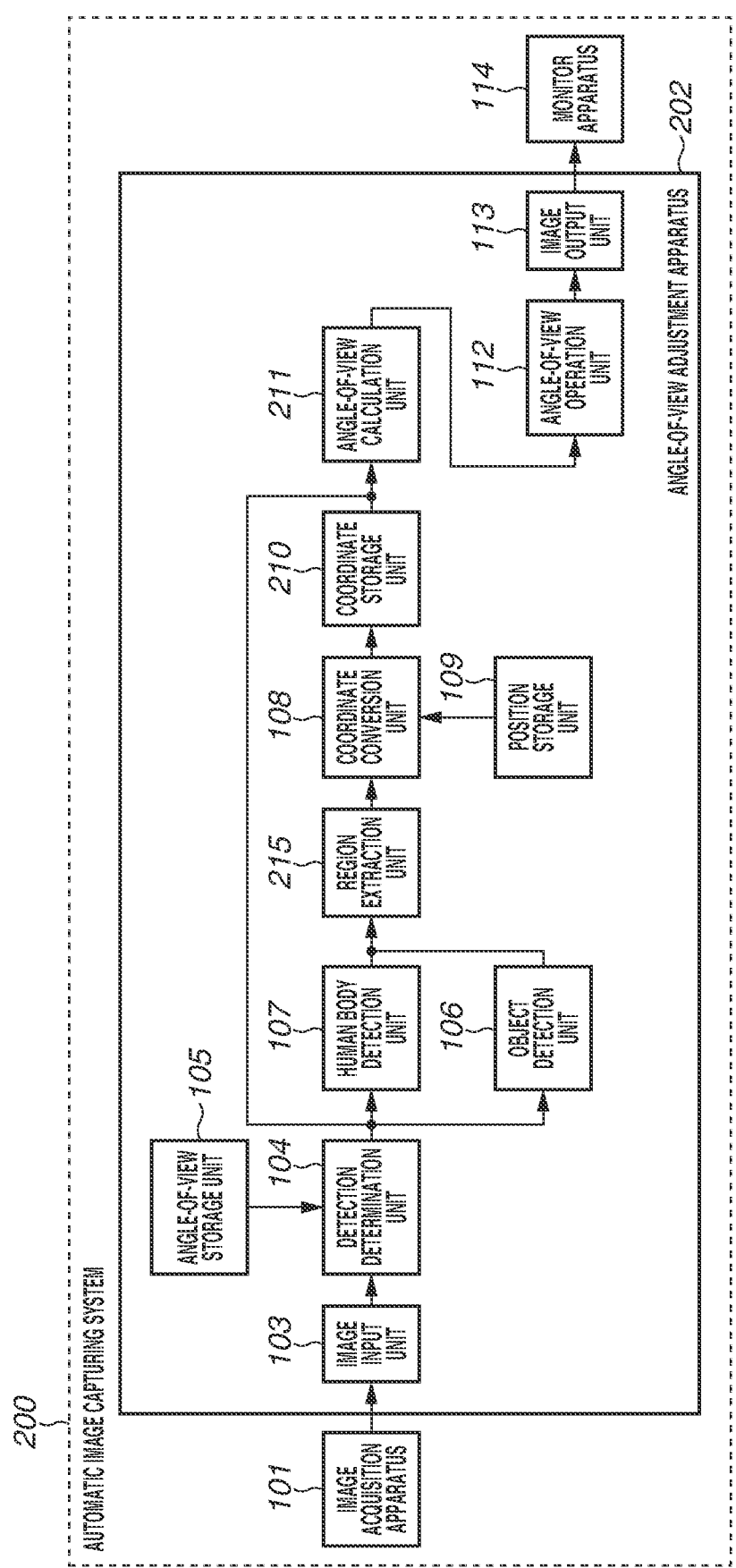
FIG. 7 is a block configuration diagram of an automatic image capturing system according to a second exemplary embodiment.

In the following description, a configuration example of an image capturing control apparatus according to a second exemplary embodiment is described with reference to FIG. 7. FIG. 7 is a block diagram illustrating a functional configuration of an automatic image capturing system 200 including an angle-of-view adjustment apparatus 202, which is an image capturing control apparatus according to the second exemplary embodiment. The automatic image capturing system 200 in the second exemplary embodiment includes an image acquisition apparatus 101, the angle-of-view adjustment apparatus 202, and a monitor apparatus 114. The angle-of-view adjustment apparatus 202 and the monitor apparatus 114 are interconnected via a video interface. Furthermore, even in the second exemplary embodiment, a use application of automatically performing image capturing of a scene in which an instructor is giving a lecture is assumed to be taken as an example.

The angle-of-view adjustment apparatus 202 in the second exemplary embodiment detects a human body, an object, and a region of interest on the object from a captured image, stores intra-angle-of-view coordinate values of them as PT coordinate values, and, when calculating an angle of view using the PT coordinate values, causes the region of interest to lie at the end of the angle of view (an angle-of-view end). Thus, the angle-of-view adjustment apparatus 202 in the second exemplary embodiment calculates, when acquiring an angle of view in which to set a human body and an object, such an angle of view as to cause the human body to lie at a position having room from the end of the angle of view. In the second exemplary embodiment, an example in which a writing-on-blackboard region is used as the region of interest is taken. The writing-on-blackboard region is, for example, a region in which the content of a lecture has been written on, for example, a blackboard or white board for use in the lecture.

Upon receiving image information as an input from the image acquisition apparatus 101, the angle-of-view adjustment apparatus 202 in the second exemplary embodiment determines whether an object which is to be set in an angle of view as a target subject has been detected, and, if the object has not been detected, the angle-of-view adjustment apparatus 202 adjusts the angle of view with use of a preset function and performs object detection using an image obtained by performing image capturing of the object. Moreover, the angle-of-view adjustment apparatus 202 converts intra-angle-of-view coordinates of the object obtained at that time into PT coordinate values using PTZ values of the camera, and stores the PT coordinate values. After that, the angle-of-view adjustment apparatus 202 detects a human body or a writing-on-blackboard region in the image, and, as with the case of the object, converts intra-angle-of-view coordinates into PT coordinate values. Then, the angle-of-view adjustment apparatus 202 sets the human body and the object in the angle of view by performing adjustment to an angle of view in which the writing-on-blackboard region lies at the angle-of-view end and the human body lies at a position having room from the end of the angle of view, based on the PT coordinate values of the human body, the object, and the writing-on-blackboard region. After that, the angle-of-view adjustment apparatus 202 outputs image information subjected to angle-of-view adjustment to the monitor apparatus 114, thus causing a video image that is based on the image information to be displayed on the monitor apparatus 114.

In the angle-of-view adjustment apparatus 202, the image input unit 103, the detection determination unit 104, the angle-of-view storage unit 105, the object detection unit 106, the human body detection unit 107, the coordinate conversion unit 108, the position storage unit 109, the angle-of-view operation unit 112, and the image output unit 113 are similar to those in the first exemplary embodiment. The angle-of-view adjustment apparatus 202 in the second exemplary embodiment differs in the processing operations performed in a coordinate storage unit 210 and an angle-of-view calculation unit 211 and in that a region extraction unit 215 is further included from that in the first exemplary embodiment. In the following description, processing operations and configurations different from those in the first exemplary embodiment are described.

The region extraction unit 215 performs extraction of a writing-on-blackboard region with use of a coordinate value and image information about the human body input from the human body detection unit 107 or a coordinate value and image information about the object input from the object detection unit 106. The method for extracting a writing-on-blackboard region to be used can include known methods such as a method of extracting a writing-on-blackboard region based on a difference in luminance information between frame images different on the time axis of a moving image and a method of extracting a writing-on-blackboard region based on a character recognition result or a figure recognition result, and the detailed description thereof is omitted. Then, the region extraction unit 215 outputs the coordinate value of the writing-on-blackboard region, the coordinate value of the human body, and the coordinate value of the object represented by intra-angle-of-view coordinates to the coordinate conversion unit 108 together with the respective pieces of image information.

The coordinate conversion unit 108 converts the respective intra-angle-of-view coordinates of the writing-on-blackboard region, the human body, and the object into PT coordinate values by performing the processing similar to that described in the first exemplary embodiment. The coordinate storage unit 210 stores the PT coordinate values of the human body, the PT coordinate values of the object, and the PT coordinate values of the writing-on-blackboard region and the respective pieces of image information input from the coordinate conversion unit 108. Then, the coordinate storage unit 210 outputs those PT coordinate values and respective pieces of image information to the angle-of-view calculation unit 211.

The angle-of-view calculation unit 211 calculates an angle of view in which the human body and the object are set, the writing-on-blackboard region lies at the angle-of-view end, and the human body lies at a position having room from the end of the angle of view, based on the PT coordinate values of the human body, the PT coordinate values of the object, and the PT coordinate values of the writing-on-blackboard region and the respective pieces of image information input from the coordinate storage unit 210.

Figure 8:
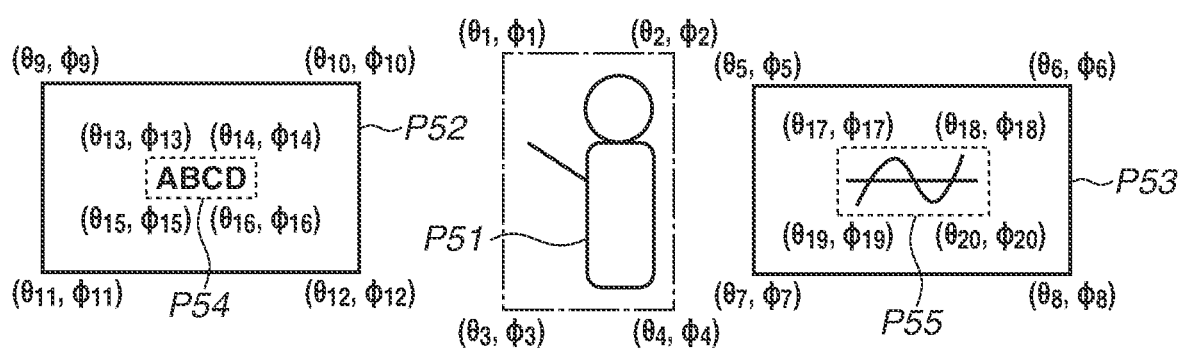
FIG. 8 is an explanatory diagram of processing for extracting a writing-on-blackboard region inside an object.

FIG. 8 is a diagram illustrating PT coordinate values input from the coordinate storage unit 210. A human body P51 is assumed to correspond to the human body P1 illustrated in FIG. 2, and objects P52 and P53 are assumed to correspond to the objects P2 and P3 illustrated in FIG. 2. Moreover, a rectangular region surrounded by a dashed line in the object P52 illustrated in FIG. 8 is assumed to be a writing-on-blackboard region P54 extracted with respect to the object P52, and a rectangular region surrounded by a dashed line in the object P53 is assumed to be a writing-on-blackboard region P55 extracted with respect to the object P53. Moreover, in FIG. 8, as with the PT coordinates illustrated in FIG. 4 and FIG. 5 described above, PT coordinate values of the rectangle representing the human body P51 are assumed to be represented by $(\theta 1, \Phi 1)$, $(\theta 2, \Phi 2)$, $(\theta 3, \Phi 3)$, and $(\theta 4, \Phi 4)$ in order of an upper-left vertex, an upper-right vertex, a lower-left vertex, and a lower-right vertex of the rectangle. Moreover, PT coordinate values of the rectangle representing the object P53 are assumed to be represented by $(\theta 5, \Phi 5)$, $(\theta 6, \Phi 6)$, $(\theta 7, \Phi 7)$, and $(\theta 8, \Phi 8)$ and PT coordinate values of the rectangle representing the object P52 are assumed to be represented by $(\theta 9, \Phi 9)$, $(\theta 10, \Phi 10)$, $(\theta 11, \Phi 11)$, and $(\theta 12, \Phi 12)$ in order of an upper-left vertex, an upper-right vertex, a lower-left vertex, and a lower-right vertex of the rectangle, as described above. PT coordinate values of the rectangle representing the writing-on-blackboard region P54 are assumed to be represented by $(\theta 13, \Phi 13)$, $(\theta 14, \Phi 14)$, $(\theta 15, \Phi 15)$, and $(\theta 16, \Phi 16)$ in order of an upper-left vertex, an upper-right vertex, a lower-left vertex, and a lower-right vertex of the rectangle. Moreover, PT coordinate values of the rectangle representing the writing-on-blackboard region P55 are assumed to be represented by $(\theta 17, \Phi 17)$, $(\theta 18, \Phi 18)$, $(\theta 19, \Phi 19)$, and $(\theta 20, \Phi 20)$ in order of an upper-left vertex, an upper-right vertex, a lower-left vertex, and a lower-right vertex of the rectangle.

Figure 9:
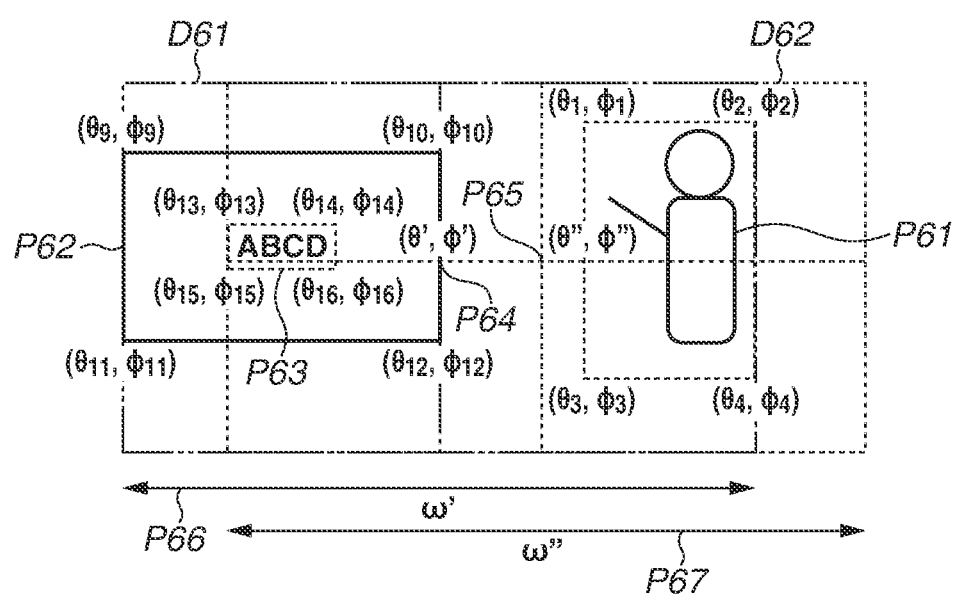
FIG. 9 is an explanatory diagram of angle-of-view control according to the second exemplary embodiment.

FIG. 9 is a diagram illustrating the manner in which the angle-of-view calculation unit 211 in the second exemplary embodiment calculates an angle of view in which to set the human body P51 and the writing-on-blackboard region P54, based on those PT coordinate values. In FIG. 9, a human body P61 corresponds to the human body P51 illustrated in FIG. 8, and an object P62 and a writing-on-blackboard region P63 respectively correspond to the object P52 and the writing-on-blackboard region P54 illustrated in FIG. 8. Moreover, the center P64 corresponds to the center P44 of an angle of view calculated in the way similar to the method described in the first exemplary embodiment, and the PT coordinate values of the center P64 is assumed to be $(\theta', \Phi')$. Similarly, a horizontal angle-of-view value P66 corresponds to the horizontal angle-of-view value P45 calculated in the way similar to the method described in the first exemplary embodiment, and the horizontal angle-of-view value P66 is assumed to be $\omega'$. Then, an angle of view D61 is assumed to correspond to the above-mentioned angle of view D41 illustrated in FIG. 5.

Here, in the case of the angle of view D61, since the human body P61 lies at the end of the angle of view D61, it is highly likely that the human body P61 moves outside the angle of view D61 by, for example, movement thereof and is lost from sight. Therefore, in the case of the second exemplary embodiment, to give room in which, even if the human body P61 moves to some extent, the writing-on-blackboard region P63 is set in the angle of view and the human body P61 lies at the end of the angle of view, the angle-of-view calculation unit 211 calculates an angle of view D62 obtained by sliding the angle of view D61 obtained by the calculation described in the first exemplary embodiment in such a way as to cause the writing-on-blackboard region P63 to lie at the angle-of-view end. The angle of view D62 illustrated in FIG. 9 is an angle of view obtained by such sliding. When PT coordinate values of the center P65 of the angle of view D62 are denoted by (θ", Φ") and the horizontal angle-of-view value P67 is denoted by ω", they are represented by the following formulae (4). Then, the angle-of-view calculation unit 211 outputs the calculated angle of view D62 and image information to the angle-of-view operation unit 112.

$$\theta''=\theta'+(\theta 13-\theta 9), \Phi''=\Phi', \omega''=\omega' \quad (4)$$

Figure 10:
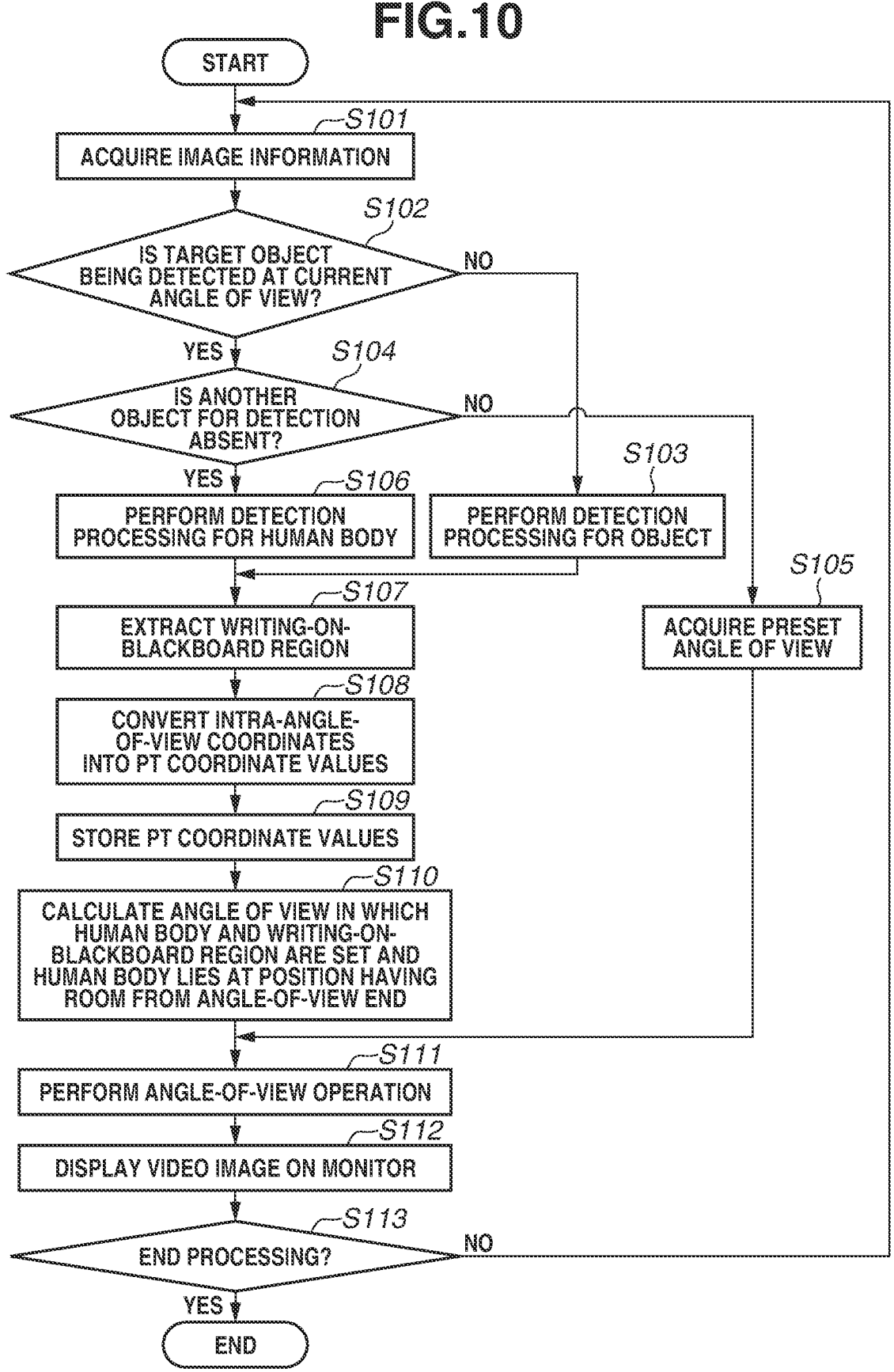
FIG. 10 is a flowchart of angle-of-view adjustment processing according to the second exemplary embodiment.

FIG. 10 is a flowchart particularly illustrating the flow of angle-of-view adjustment processing which the angle-of-view adjustment apparatus 202 performs out of processing operations related to the automatic image capturing system 200 according to the second exemplary embodiment. Upon receiving an instruction for startup issued by a user operation, the automatic image capturing system 200 starts processing for automatic image capturing. First, in step S101, the image input unit 103 of the angle-of-view adjustment apparatus 202 acquires image information from the image acquisition apparatus 101. Next, in step S102, the detection determination unit 104 determines whether a target object which is to be set in the angle of view is being detected with use of the image information input from the image input unit 103. If the result of determination in step S102 is true (YES in step S102), the detection determination unit 104 advances the processing to step S104. On the other hand, if the result of determination in step S102 is false (NO in step S102), the detection determination unit 104 outputs the image information to the object detection unit 106, and the angle-of-view adjustment apparatus 202 advances the processing to step S103.

In step S103, the object detection unit 106 performs object detection processing with use of the image information input from the detection determination unit 104, and outputs coordinates of the detected object and the image information to the region extraction unit 215. Then, the angle-of-view adjustment apparatus 202 advances the processing to step S107.

In step S104, the detection determination unit 104 determines whether another object targeted for detection is absent, with use of information indicating whether a preset angle of view acquired from the angle-of-view storage unit 105 has been used. If the result of determination in step S104 is true (YES in step S104), the detection determination unit 104 outputs the image information to the human body detection unit 107. Then, the angle-of-view adjustment apparatus 202 advances the processing to step S106. On the other hand, if the result of determination in step S104 is false (NO in step S104), the detection determination unit 104 advances the processing to step S105.

In step S105, the detection determination unit 104 acquires information about a preset angle of view from the angle-of-view storage unit 105. Then, the angle-of-view adjustment apparatus 202 advances the processing to step S111. Processing operations which are performed in a case where the processing has proceeded from step S105 to step S111 and subsequent steps are similar to those in a case where the processing has proceeded from step S5 to step S10 and subsequent steps illustrated in FIG. 6 described above.

Moreover, in step S106, the human body detection unit 107 detects a human body with use of the image information acquired from the detection determination unit 104, and outputs coordinates of the detected human body and the image information to the region extraction unit 215. Then, the angle-of-view adjustment apparatus 202 advances the processing to step S107.

In step S107, the region extraction unit 215 extracts a writing-on-blackboard region with use of the coordinates of the object and image information input from the object detection unit 106. Then, the region extraction unit 215 outputs, to the coordinate conversion unit 108, the coordinates of the extracted writing-on-blackboard region and image information, the coordinates of the human body and image information input from the human body detection unit 107, and the coordinates of the object and image information input from the object detection unit 106. Then, the angle-of-view adjustment apparatus 202 advances the processing to step S108.

In step S108, the coordinate conversion unit 108 converts intra-angle-of-view coordinates into PT coordinate values based on the coordinates of the writing-on-blackboard region and image information, the coordinates of the human body and image information, the coordinates of the object and image information obtained from the region extraction unit 215 and the current PTZ values of the camera obtained from the position storage unit 109. Then, the coordinate conversion unit 108 outputs the PT coordinate values obtained by conversion to the coordinate storage unit 210. Then, the angle-of-view adjustment apparatus 202 advances the processing to step S109.

In step S109, the coordinate storage unit 210 stores the PT coordinate values acquired from the coordinate conversion unit 108. Then, the angle-of-view adjustment apparatus 202 advances the processing to step S110. In step S110, the angle-of-view calculation unit 211 calculates an angle of view in which the human body and the object are set, the writing-on-blackboard region lies at the angle-of-view end, and the human body lies at a position having room from the angle-of-view end, from the PT coordinate values of the writing-on-blackboard region, the human body, and the object acquired from the coordinate storage unit 210. Additionally, the angle-of-view calculation unit 211 outputs information about the calculated angle of view to the angle-of-view operation unit 112. Then, the angle-of-view adjustment apparatus 202 advances the processing to step S111.

In step S111, the angle-of-view operation unit 112 performs angle-of-view adjustment in such a way as to bring about an angle of view in which the human body and the object are set, the writing-on-blackboard region lies at the angle-of-view end, and the human body lies at a position having room from the angle-of-view end, based on the information about the angle of view acquired from the angle-of-view calculation unit 211. Then, the angle-of-view adjustment apparatus 202 advances the processing to step S112. In step S112, the image output unit 113 outputs the image information input from the angle-of-view operation unit 112 to the monitor apparatus 114. This causes a video image that is based on the image information to be displayed on the monitor apparatus 114. Then, the angle-of-view adjustment apparatus 202 advances the processing to step S113.

In step S113, the angle-of-view adjustment apparatus 202 determines whether a stopping operation for the automatic image capturing processing has been performed by the automatic image capturing system on/off switch being operated by a user operation. If the result of determination in step S113 is false (NO in step S113), the angle-of-view adjustment apparatus 202 returns the processing to step S101. On the other hand, if the result of determination in step S113 is true (YES in step S113), the angle-of-view adjustment apparatus 202 ends the processing illustrated in the flowchart of FIG. 10.

The angle-of-view adjustment apparatus 202 in the second exemplary embodiment previously converts intra-angle-of-view coordinates obtained by performing object detection into PT coordinate values and stores the PT coordinate values, then performs angle-of-view calculation based on the PT coordinate values, and performs control to bring about an angle of view in which a region of interest lies at the angle-of-view end and a human body lies at a position having room from the angle-of-view end. Thus, according to the second exemplary embodiment, in a case where an object which is to be set in the current angle of view of the camera lies outside the current angle of view, it becomes possible to continue performing image capturing at an angle of view in which the human body lying inside the angle of view and the object lying outside the angle of view are set, the writing-on-blackboard region lies at the angle-of-view end, and the human body lies at a position having room from the angle-of-view end.

Figure 11:
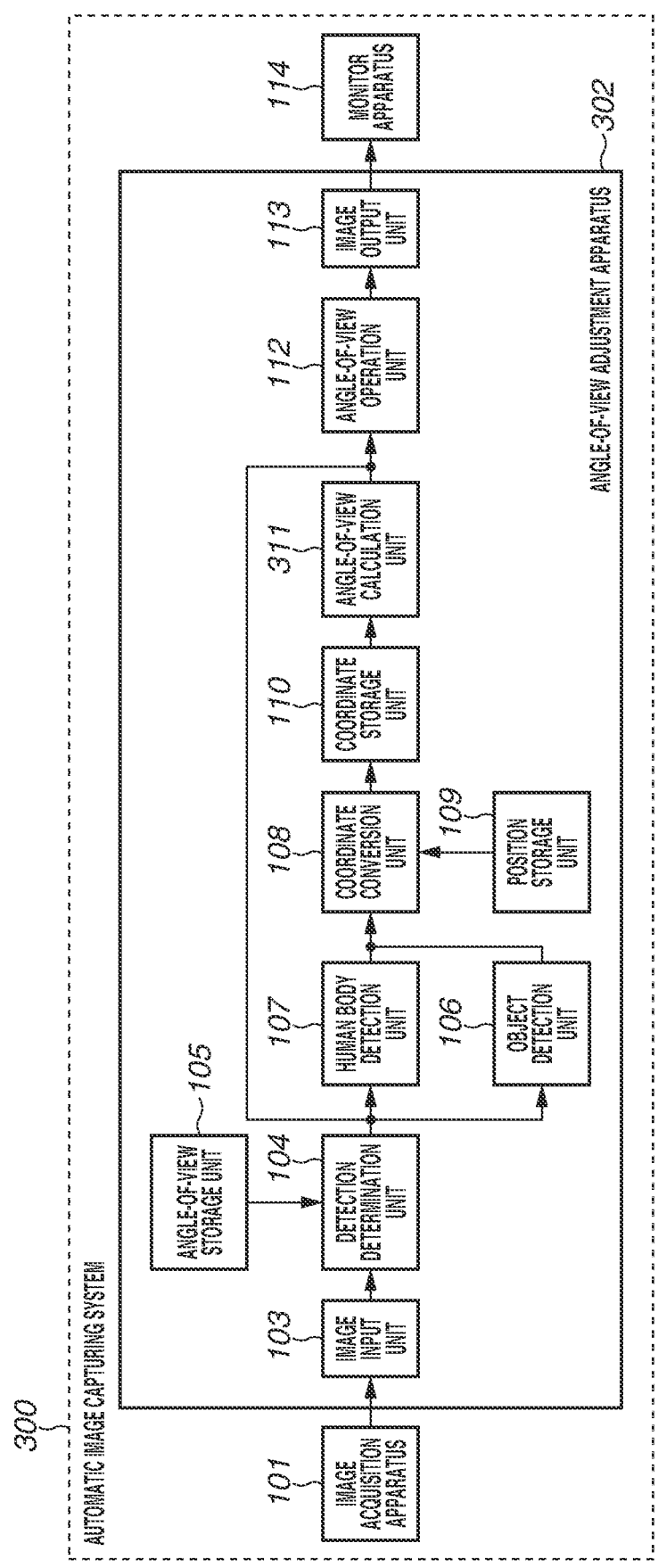
FIG. 11 is a block configuration diagram of an automatic image capturing system according to a third exemplary embodiment.

In the following description, a configuration example of an image capturing control apparatus according to a third exemplary embodiment is described with reference to FIG. 11. FIG. 11 is a block diagram illustrating a functional configuration of an automatic image capturing system 300 including an angle-of-view adjustment apparatus 302, which is an image capturing control apparatus according to the third exemplary embodiment. The automatic image capturing system 300 in the third exemplary embodiment includes an image acquisition apparatus 101, the angle-of-view adjustment apparatus 302, and a monitor apparatus 114. The angle-of-view adjustment apparatus 302 and the monitor apparatus 114 are interconnected via a video interface. Furthermore, even in the third exemplary embodiment, a use application of automatically performing image capturing of a scene in which an instructor is giving a lecture is assumed to be taken as an example.

The angle-of-view adjustment apparatus 302 in the third exemplary embodiment detects a human body and an object from a captured image, stores intra-angle-of-view coordinate values of them as PT coordinate values, and, when calculating an angle of view using the PT coordinate values, brings about an angle of view in which the human body lies at a position having room corresponding to the horizontal width of the human body from the angle-of-view end. Thus, when setting the human body and the object in an angle of view, the angle-of-view adjustment apparatus 302 in the third exemplary embodiment performs angle-of-view adjustment in such a way as to cause the human body to lie at a position having room corresponding to the horizontal width of the human body from the angle-of-view end.

Upon receiving image information as an input from the image acquisition apparatus 101, the angle-of-view adjustment apparatus 302 in the third exemplary embodiment determines whether an object which is to be set in an angle of view as a target subject has been detected, and, if the object has not been detected, the angle-of-view adjustment apparatus 302 adjusts the angle of view with use of a preset function and performs object detection using an image obtained by performing image capturing of the object. Moreover, the angle-of-view adjustment apparatus 302 converts intra-angle-of-view coordinates of the object obtained at that time into PT coordinate values using PTZ values of the camera, and stores the PT coordinate values. After that, the angle-of-view adjustment apparatus 302 detects a human body in the image, and, as with the case of the object, converts intra-angle-of-view coordinates into PT coordinate values. Then, the angle-of-view adjustment apparatus 302 sets the human body and the object in the angle of view by calculating an angle of view in which the human body lies at a position having room corresponding to the horizontal width of the human body from the angle-of-view end to perform angle-of-view adjustment based on the PT coordinate values of the human body and the object. After that, the angle-of-view adjustment apparatus 302 outputs image information subjected to angle-of-view adjustment to the monitor apparatus 114, thus causing a video image that is based on the image information to be displayed on the monitor apparatus 114.

In the angle-of-view adjustment apparatus 302, the image input unit 103, the detection determination unit 104, the angle-of-view storage unit 105, the object detection unit 106, the human body detection unit 107, the coordinate conversion unit 108, the position storage unit 109, the coordinate storage unit 110, the angle-of-view operation unit 112, and the image output unit 113 are similar to those described above. The angle-of-view adjustment apparatus 302 in the third exemplary embodiment differs in the processing operation performed in an angle-of-view calculation unit 311 from that in the first exemplary embodiment. In the following description, processing operations and configurations different from those in the first exemplary embodiment are described.

The angle-of-view calculation unit 311 calculates an angle of view in which the human body lying inside the angle of view and the object having lain outside the angle of view are set and the human body lies at a position having room corresponding to the horizontal width of the human body from the angle-of-view end, with use of the PT coordinate values of the human body and the object and image information acquired from the coordinate storage unit 110.

Figure 12:
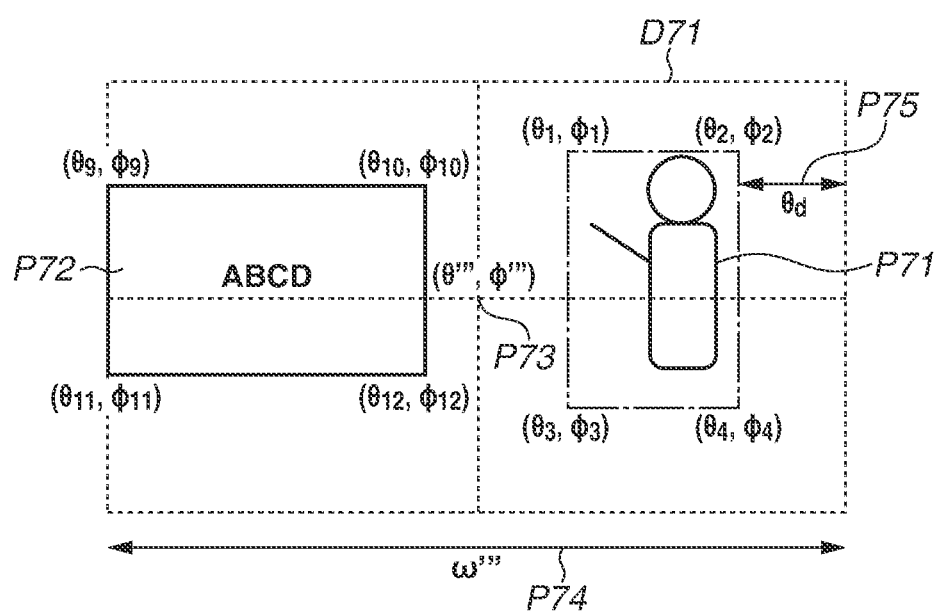
FIG. 12 is an explanatory diagram of angle-of-view control according to the third exemplary embodiment.

FIG. 12 is a diagram illustrating the manner in which the angle-of-view calculation unit 311 in the third exemplary embodiment calculates an angle of view based on those PT coordinate values. In FIG. 12, a human body P71 corresponds to the human body P41 illustrated in FIG. 5, and an object P72 corresponds to the object P42 illustrated in FIG. 5. Moreover, in FIG. 12, PT coordinate values of the rectangle representing the human body P71 are assumed to be represented by ($\theta1$, $\Phi1$), ($\theta2$, $\Phi2$), ($\theta3$, $\Phi3$), and ($\theta4$, $\Phi14$), as with those described above, in order of an upper-left vertex, an upper-right vertex, a lower-left vertex, and a lower-right vertex of the rectangle. Moreover, PT coordinate values of the rectangle representing the object P72 are assumed to be represented by ($\theta9$, $\Phi9$), ($\theta10$, $\Phi10$), ($\theta11$, $\Phi11$), and ($\theta12$, $\Phi12$) in order of an upper-left vertex, an upper-right vertex, a lower-left vertex, and a lower-right vertex of the rectangle. An angle of view D71 represents an angle of view in which the human body P71 and the object P72 are set and the human body P71 lies at a position having room corresponding to the horizontal width (distance P75) of the human body P71 from the angle-of-view end. Moreover, PT coordinate values of the center P73 in the angle of view D71 are assumed to be ($\theta'''$, $\Phi'''$), and the horizontal angle-of-view value P74 is assumed to be $\omega'''$. Then, when the distance P75 between the detection rectangle representing the human body P71 and the angle-of-view end is denoted by $\theta d$, the angle-of-view end $\theta d$ is expressed by the following formula (5).

$$\theta d = \theta 2 - \theta 1 \qquad (5)$$

Moreover, the P coordinate value $\theta'''$ of the center P73 of the angle of view can be calculated as an average value of P coordinate values obtained by adding the distance P75 corresponding to the horizontal width of the human body P71 to the P coordinate values of the human body P71 and the P coordinate values of the object P72, as expressed by formula (6).

$$\theta''' = (\max(\theta 1, \theta 2, \theta 9, \theta 10) + \theta d + \min(\theta 1, \theta 2, \theta 9, \theta 10))/2 \qquad (6)$$

Moreover, the T coordinate value $\theta'''$ of the center P73 of the angle of view can be calculated as an average value of T coordinate values of the human body P71 and T coordinate values of the object P72, as expressed by formula (7).

$$\Phi''' = (\max(\Phi 1, \Phi 2, \Phi 9, \Phi 10) + \min(\Phi 1, \Phi 2, \Phi 9, \Phi 10))/2 \qquad (7)$$

Additionally, the horizontal angle-of-view value $\omega'''$ can be calculated as a value obtained by adding a difference value between the P coordinate values of the human body P71 and the object P72 to the distance P75 corresponding to the horizontal width of the human body P71, as expressed by formula (8).

$$\omega''' = (\max(\theta 1, \theta 2, \theta 9, \theta 10) - \min(\theta 1, \theta 2, \theta 9, \theta 10)) + \theta d \qquad (8)$$

Figure 13:
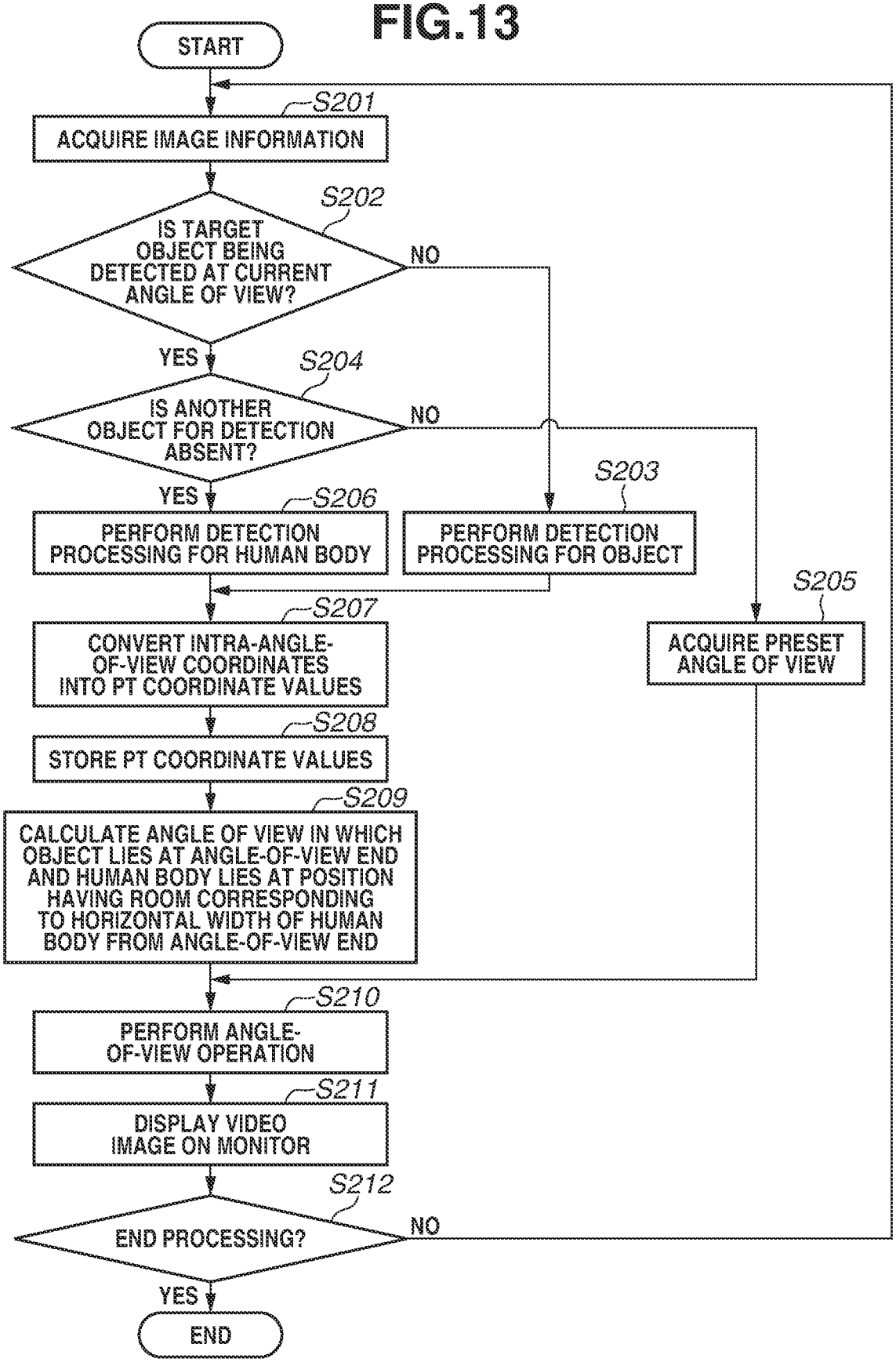
FIG. 13 is a flowchart of angle-of-view adjustment processing according to the third exemplary embodiment.

Then, the angle-of-view calculation unit 311 outputs the calculated angle of view and image information to the angle-of-view operation unit 112. FIG. 13 is a flowchart particularly illustrating the flow of angle-of-view adjustment processing which the angle-of-view adjustment apparatus 302 performs out of processing operations related to the automatic image capturing system 300 according to the third exemplary embodiment. Upon receiving an instruction for startup issued by a user operation, the automatic image capturing system 300 starts processing for automatic image capturing.

First, in step S201, the image input unit 103 of the angle-of-view adjustment apparatus 302 acquires image information from the image acquisition apparatus 101. Next, in step S202, the detection determination unit 104 determines whether an object serving as a target subject which is to be set in the angle of view is being detected with use of the image information input from the image input unit 103. If the result of determination in step S202 is true (YES in step S202), the detection determination unit 104 advances the processing to step S204. On the other hand, if the result of determination in step S202 is false (NO in step S202), the detection determination unit 104 outputs the image information to the object detection unit 106, and the angle-of-view adjustment apparatus 302 advances the processing to step S203.

In step S203, the object detection unit 106 performs object detection processing with use of the image information input from the detection determination unit 104, and outputs coordinates of the detected object and the image information to the coordinate conversion unit 108. Then, the angle-of-view adjustment apparatus 302 advances the processing to step S207.

In step S204, the detection determination unit 104 determines whether another object targeted for detection is absent, with use of information indicating whether a preset angle of view acquired from the angle-of-view storage unit 105 has been used. If the result of determination in step S204 is true (YES in step S204), the detection determination unit 104 outputs the image information to the human body detection unit 107, and then, the angle-of-view adjustment apparatus 302 advances the processing to step S206. On the other hand, if the result of determination in step S204 is false (NO in step S204), the detection determination unit 104 advances the processing to step S205.

In step S205, the detection determination unit 104 acquires information about a preset angle of view from the angle-of-view storage unit 105, and then, the angle-of-view adjustment apparatus 302 advances the processing to step S210. Processing operations which are performed in a case where the processing has proceeded from step S205 to step S210 and subsequent steps are similar to those in a case where the processing has proceeded from step S5 to step S10 and subsequent steps illustrated in FIG. 6 described above. Moreover, in step S206, the human body detection unit 107 detects a human body with use of the image information acquired from the detection determination unit 104, and outputs coordinates of the detected human body and the image information to the coordinate conversion unit 108. Then, the angle-of-view adjustment apparatus 302 advances the processing to step S207.

In step S207, the coordinate conversion unit 108 converts intra-angle-of-view coordinates into PT coordinate values based on the coordinates of the human body and image information or the coordinates of the object and image information and the current PTZ values of the camera. Then, the coordinate conversion unit 108 outputs the PT coordinate values obtained by conversion to the coordinate storage unit 110. After that, the angle-of-view adjustment apparatus 302 advances the processing to step S208. In step S208, the coordinate storage unit 110 stores the PT coordinate values acquired from the coordinate conversion unit 108, and then, the angle-of-view adjustment apparatus 302 advances the processing to step S209.

In step S209, the angle-of-view calculation unit 311 calculates an angle of view in which the object lies at the angle-of-view end and the human body lies at a position having room corresponding to the horizontal width of the human body from the angle-of-view end, from the PT coordinate values of the human body and the object acquired from the coordinate storage unit 110. Additionally, the angle-of-view calculation unit 311 outputs information about the calculated angle of view to the angle-of-view operation unit 112. After that, the angle-of-view adjustment apparatus 302 advances the processing to step S210. In step S210, the angle-of-view operation unit 112 performs an angle-of-view operation corresponding to an angle of view in which the human body and the object are set, the object lies at the angle-of-view end, and the human body lies at a position having room corresponding to the horizontal width of the human body from the angle-of-view end, based on the information about the angle of view acquired from the angle-of-view calculation unit 311. After that, the angle-of-view adjustment apparatus 302 advances the processing to step S211.

In step S211, the image output unit 113 outputs the image information input from the angle-of-view operation unit 112 to the monitor apparatus 114. This causes a video image that is based on the image information to be displayed on the monitor apparatus 114. Next, in step S212, the angle-of-view adjustment apparatus 302 determines whether a stopping operation for the automatic image capturing processing has been performed by the automatic image capturing system on/off switch being operated. If the result of determination in step S212 is false (NO in step S212), the angle-of-view adjustment apparatus 302 returns the processing to step S201. On the other hand, if the result of determination in step S212 is true (YES in step S212), the angle-of-view adjustment apparatus 302 ends the processing illustrated in the flowchart of FIG. 13.

The angle-of-view adjustment apparatus 302 in the third exemplary embodiment previously converts intra-angle-of-view coordinates obtained by performing object detection into PT coordinate values and stores the PT coordinate values, and then performs angle-of-view calculation with use of, in addition to the PT coordinate values of the human body and the object, the horizontal width of the human body. Thus, according to the third exemplary embodiment, it is possible to continue performing image capturing at an angle of view in which the human body and the object lies and the human body lies at a position having room corresponding to the horizontal width of the human body from the angle-of-view end.

Figure 14:
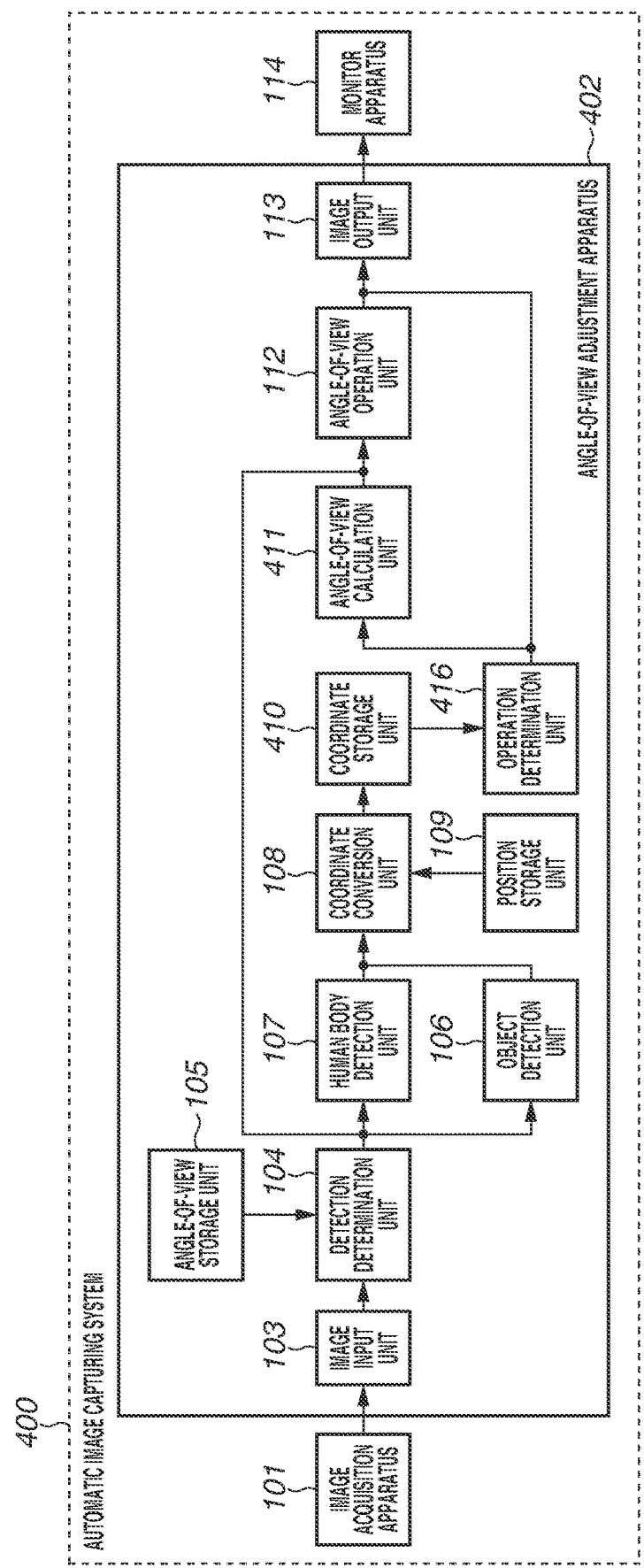
FIG. 14 is a block configuration diagram of an automatic image capturing system according to a fourth exemplary embodiment.

In the following description, a configuration example of an image capturing control apparatus according to a fourth exemplary embodiment is described with reference to FIG. 14. FIG. 14 is a block diagram illustrating a functional configuration of an automatic image capturing system 400 including an angle-of-view adjustment apparatus 402, which is an image capturing control apparatus according to the fourth exemplary embodiment. The automatic image capturing system 400 in the fourth exemplary embodiment includes an image acquisition apparatus 101, the angle-of-view adjustment apparatus 402, and a monitor apparatus 114. The angle-of-view adjustment apparatus 402 and the monitor apparatus 114 are interconnected via a video interface. Furthermore, even in the fourth exemplary embodiment, a use application of automatically performing image capturing of a scene in which an instructor is giving a lecture is assumed to be taken as an example.

The angle-of-view adjustment apparatus 402 in the fourth exemplary embodiment detects a human body and an object from a captured image, stores intra-angle-of-view coordinate values of them as PT coordinate values, and performs angle-of-view calculation with use of a movement history of the human body in a given period and the PT coordinate values of the object. Thus, when acquiring an angle of view in which to set a human body lying inside the angle of view and an object having lain outside the angle of view, the angle-of-view adjustment apparatus 402 in the fourth exemplary embodiment performs angle-of-view calculation in consideration of a movement history of the human body.

Upon receiving image information as an input from the image acquisition apparatus 101, the angle-of-view adjustment apparatus 402 in the fourth exemplary embodiment determines whether an object which is to be set in an angle of view as a target subject has been detected, and, if the object has not been detected, the angle-of-view adjustment apparatus 402 adjusts the angle of view with use of a preset function and performs object detection using an image obtained by performing image capturing of the object. Moreover, the angle-of-view adjustment apparatus 402 converts intra-angle-of-view coordinates of the object obtained at that time into PT coordinate values using PTZ values of the camera, and stores the PT coordinate values. After that, the angle-of-view adjustment apparatus 402 detects a human body in the image, and converts intra-angle-of-view coordinates of the human body into PT coordinate values as with the object. Moreover, at this time, the angle-of-view adjustment apparatus 402 stores PT coordinate values of the human body obtained at intervals of a given time in a given period, as history information about movement of the human body. Then, the angle-of-view adjustment apparatus 402 calculates an angle of view in which to set the human body and the object from the movement history of the human body obtained at intervals of the given time in the given period and the PT coordinate values of the object and then performs angle-of-view adjustment using the calculated angle of view. After that, the angle-of-view adjustment apparatus 402 outputs image information subjected to angle-of-view adjustment to the monitor apparatus 114, thus causing a video image that is based on the image information to be displayed on the monitor apparatus 114.

In the angle-of-view adjustment apparatus 402, the image input unit 103, the detection determination unit 104, the angle-of-view storage unit 105, the object detection unit 106, the human body detection unit 107, the coordinate conversion unit 108, the position storage unit 109, the angle-of-view operation unit 112, and the image output unit 113 are similar to those described above. The angle-of-view adjustment apparatus 402 in the fourth exemplary embodiment differs in the processing operation performed in a coordinate storage unit 410 and an angle-of-view calculation unit 411 and in that an operation determination unit 416 is further included from that in the first exemplary embodiment. In the following description, processing operations and configurations different from those in the first exemplary embodiment are described.

The coordinate storage unit 410 stores PT coordinate values of the human body and the object input from the coordinate conversion unit 108. The coordinate storage unit 410 in the fourth exemplary embodiment stores the PT coordinate values of the human body as history information, and outputs the history information about movement of the human body in a period designated by the operation determination unit 416 described below and the PT coordinate values of the object.

The operation determination unit 416 determines whether a given period has elapsed by timer processing. In a case where the given period has elapsed, the operation determination unit 416 acquires, from the coordinate storage unit 410, the PT coordinate values of the object, the image information, and the history information about movement of the human body in the given period, and outputs them to the angle-of-view calculation unit 411. Furthermore, in a case where the given period has not elapsed, the operation determination unit 416 outputs the image information acquired from the coordinate storage unit 410 to the image output unit 113.

The angle-of-view calculation unit 411 calculates an angle of view in which to set the human body and the object in consideration of a movement history of the human body in the given period, with use of the history information about movement of the human body, the PT coordinate values of the object, and the image information input from the coordinate storage unit 410.

FIG. 15 to FIG. 19 are diagrams used to explain the manner in which the angle-of-view calculation unit 411 in the fourth exemplary embodiment calculates an angle of view based on the history information about movement of the human body, the PT coordinate values of the object, and the image information described above. In the fourth exemplary embodiment, the given period is denoted by tn, but is assumed to be set to any value.

Figure 15:
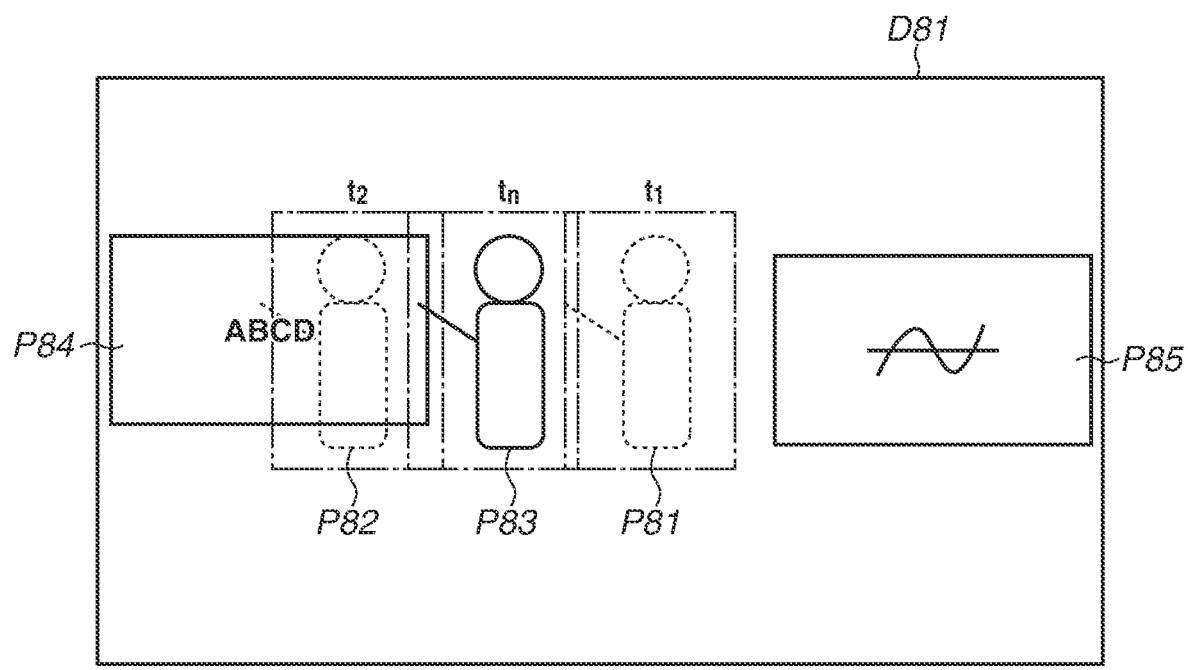
FIG. 15 is a diagram representing a movement history of a human body in a given period of time.

In FIG. 15, a range D81 represents a range encompassing a human body and objects each serving as a target subject.

Human bodies P81, P82, and P83 represent human bodies present at times t1, t2, and tn, respectively. Thus, the human body is moving, and is assumed to be present at the position of the human body P81 at time t1, present at the position of the human body P82 at time t2, and present at the position of the human body P83 at time tn. Objects P84 and P85 respectively correspond to the objects P2 and P3 illustrated in FIG. 2 described above.

FIG. 16 is a diagram illustrating PT coordinate values of human bodies (rectangles corresponding to human bodies) present at respective times illustrated in FIG. 15 and PT coordinate values of objects (being assumed to be objects obj1 and obj2 in FIG. 16). Furthermore, in FIG. 16, the PT coordinate values of human bodies and objects represent upper left coordinates ($\theta$, $\Phi$), width ($\theta d$), and height ($\Phi d$) of each rectangle.

Figure 17:
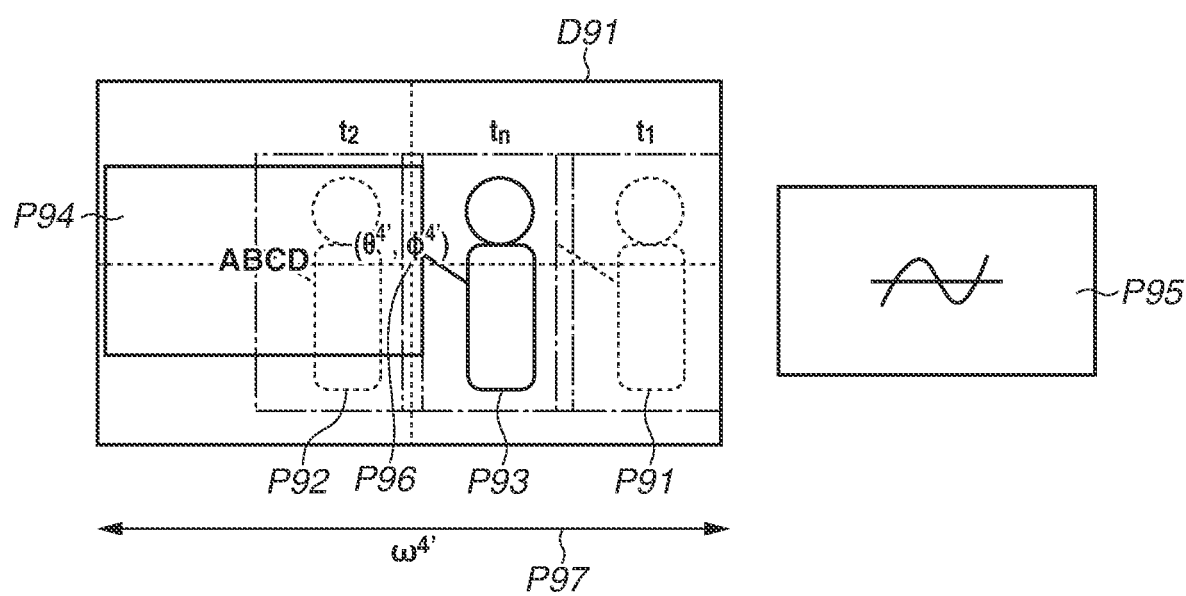
FIG. 17 is an explanatory diagram of angle-of-view control according to the fourth exemplary embodiment.

FIG. 17 is an explanatory diagram used to explain angle-of-view calculation that is based on a movement history of the human body in a period from time t1 to time tn. In the following description, the method for calculating an angle of view by the angle-of-view calculation unit 411 is described. Since positions at which the human body has been moving in the period from time t1 to time tn are positions at which the human body is likely to also move in the future, the angle-of-view calculation unit 411 calculates an angle of view in which to set all of the positions in the movement history of the human body in the above-mentioned period and an object (in this example, being assumed to be an object P94).

In FIG. 17, PT coordinate values of the center P96 of the angle of view is denoted by ($\theta 4'$, $\Phi 4'$) and a horizontal angle-of-view value P97 is denoted by $\omega 4'$. The P coordinate value $\theta 4'$ of the center P96 of the angle of view can be calculated by formula (9) based on the movement history of the human body and the P coordinate value of the object P94.

$$\theta 4'=(\max(\theta 1+\theta d1,\theta 2+\theta d2,\ldots,\theta n+\theta dn,\theta o1+\theta do1)+\min(\theta 1,\theta 2,\ldots,\theta n,\theta o1))/2 \quad (9)$$

Moreover, the T coordinate value $\Phi 4'$ of the center P96 of the angle of view can be calculated by formula (10) based on the movement history of the human body and the T coordinate value of the object P94.

$$\Phi 4'=(\min(\Phi 1,\Phi 2,\ldots,\Phi n,\Phi o1)+\max(\Phi 1+\Phi d1,\Phi 2+\Phi d2,\ldots,\Phi n+\Phi dn,\Phi o1+\Phi do1))/2 \quad (10)$$

The horizontal angle-of-view value $\omega 4'$ can be calculated as a difference value between the movement history of the human body and the P coordinate value of the object P94, as expressed by formula (11).

$$\omega 4'=\max(\theta 1+\theta d1,\theta 2+\theta d2,\ldots,\theta n+\theta dn,\theta o1+\theta do1)-\min(\theta 1,\theta 2,\ldots,\theta n,\theta o1) \quad (11)$$

The angle-of-view calculation unit 411 performs the following calculation to obtain each position to which the human body is likely to move and an angle of view D91 illustrated in FIG. 17 in which the object P94 is able to be set.

Figure 18:
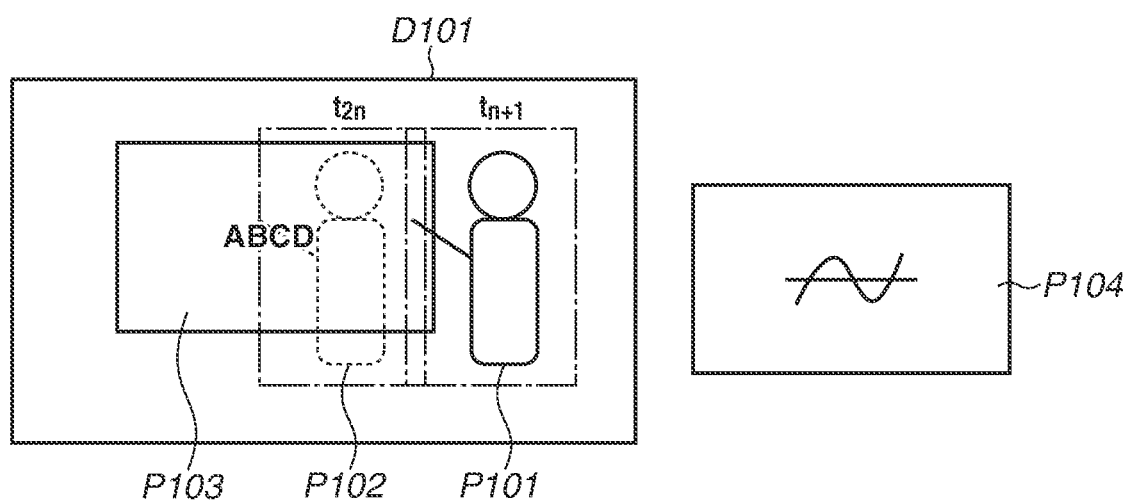
FIG. 18 is a diagram representing another example of a movement history of a human body in a given period of time.
Figure 19:
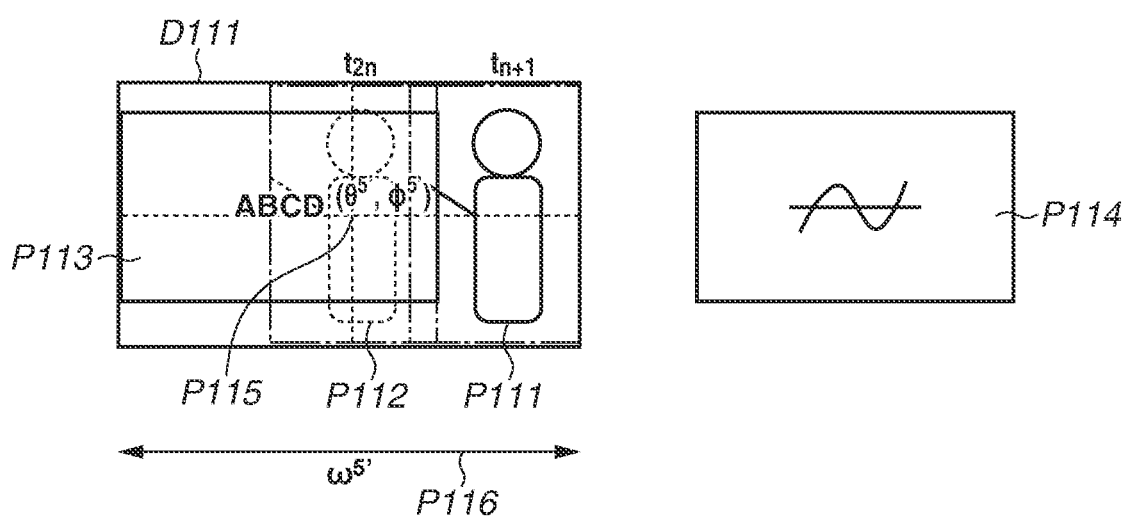
FIG. 19 is an explanatory diagram of angle-of-view control that is based on a movement history of a human body.

FIG. 18 and FIG. 19 are diagrams illustrating the manner of angle-of-view calculation which is performed in the following given period (time tn+1 to time t2n). In FIG. 18, an angle of view D101 is an angle of view having the same size as that of the angle of view D91 illustrated in FIG. 17, and human bodies P101 and P102 represent human bodies which lie at time tn+1 and time t2n, respectively.

FIG. 19 is a diagram illustrating the manner in which an angle of view has been calculated based on information about the movement history of the human body illustrated in FIG. 18 as an example. Human bodies P111 and P112 and objects P113 and P114 illustrated in FIG. 19 are the same as the human bodies P101 and P102 and the objects P103 and P104 illustrated in FIG. 18.

In FIG. 19, PT coordinate values of the center P115 of the angle of view are assumed to be ($\theta 5'$, $\Phi 5'$), and the horizontal angle-of-view value P116 is assumed to be $\omega 5'$. The P coordinate value $\theta 5'$ of the center P115 can be calculated from the movement history of the human body and the P coordinate value of the object P113, as expressed by formula (12).

$$\theta 5'=(\max(\theta n+1+\theta d(n+1),\theta n+2+\theta d(n+2),\ldots,\theta 2n+\theta d2n,\theta o1+\theta do1)+\min(\theta n+1,\theta n+2,\ldots,\theta 2n,\theta o1))/2 \quad (12)$$

The T coordinate value $\Phi 5'$ of the center P115 of the angle of view can be calculated from the movement history of the human body and the T coordinate value of the object P113, as expressed by formula (13).

$$\Phi 5'=(\min(\Phi n+1,\Phi n+2,\ldots,\Phi 2n,\Phi o1)+\max(\Phi n+1+\Phi d(n+1),\Phi n+2+\Phi d(n+2),\ldots,\Phi 2n+\Phi d2n,\Phi o1+\Phi do1))/2 \quad (13)$$

The horizontal angle-of-view value $\omega 5'$ can be calculated as a difference value between the movement history of the human body and the P coordinate value of the object P113, as expressed by formula (14).

$$\omega 5'=\max(\theta n+1+\theta d(n+1),\theta n+2+\theta d(n+2),\ldots,\theta 2n+\theta d2n,\theta o1+\theta do1)-\min(\theta n+1,\theta n+2,\ldots,\theta 2n,\theta o1) \quad (14)$$

The angle-of-view calculation unit 411 performs the above-described calculation and thus obtains an angle of view D111 illustrated in FIG. 19 in which each position to which the human body is likely to move and the object P113 is able to be set. Then, the angle-of-view calculation unit 411 calculates an angle of view tailored to the movement history of the human body at intervals of the given period in the above-described way, and outputs information about the calculated angle of view and image information to the angle-of-view operation unit 112.

Figure 20:
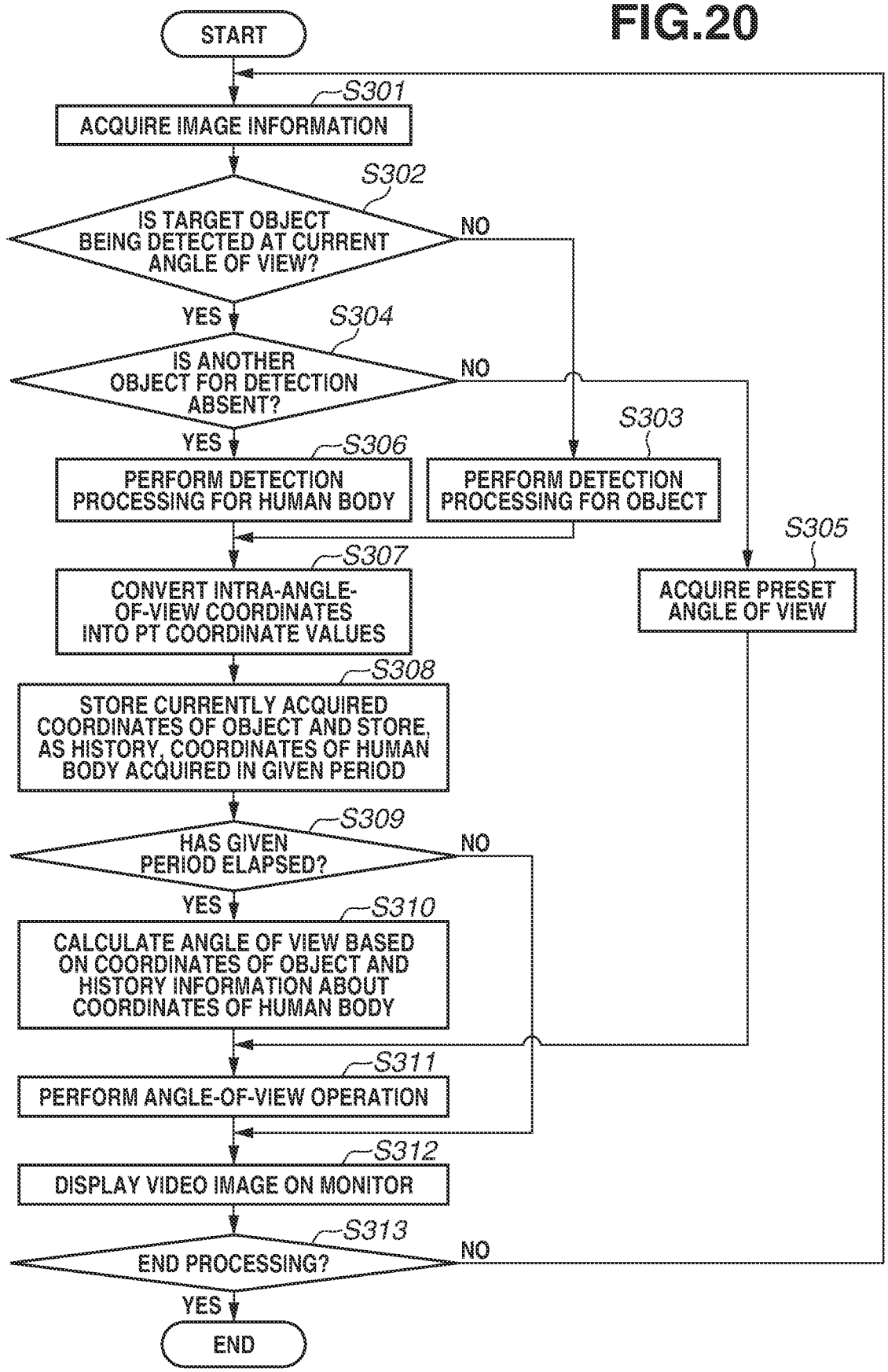
FIG. 20 is a flowchart of angle-of-view adjustment processing according to the fourth exemplary embodiment.

FIG. 20 is a flowchart particularly illustrating the flow of angle-of-view adjustment processing which the angle-of-view adjustment apparatus 402 performs out of processing operations related to the automatic image capturing system 400 according to the fourth exemplary embodiment. Upon receiving an instruction for startup issued by a user operation, the automatic image capturing system 400 starts processing for automatic image capturing.

First, in step S301, the image input unit 103 of the angle-of-view adjustment apparatus 402 acquires image information from the image acquisition apparatus 101. Next, in step S302, the detection determination unit 104 determines whether an object serving as a target subject which is to be set in the angle of view is being detected with use of the image information input from the image input unit 103. If the result of determination in step S302 is true (YES in step S302), the detection determination unit 104 advances the processing to step S304. On the other hand, if the result of determination in step S302 is false (NO in step S302), the detection determination unit 104 outputs the image information to the object detection unit 106. After that, the angle-of-view adjustment apparatus 402 advances the processing to step S303.

In step S303, the object detection unit 106 performs object detection processing with use of the image information input from the detection determination unit 104, and outputs coordinates of the detected object and the image information to the coordinate conversion unit 108. Then, the angle-of-view adjustment apparatus 402 advances the processing to step S307.

In step S304, the detection determination unit 104 determines whether another object targeted for detection is absent, with use of information indicating whether a preset angle of view acquired from the angle-of-view storage unit 105 has been used. If the result of determination in step S304 is true (YES in step S304), the detection determination unit 104 outputs the image information to the human body detection unit 107, and then, the angle-of-view adjustment apparatus 402 advances the processing to step S306. On the other hand, if the result of determination in step S304 is false (NO in step S304), the detection determination unit 104 advances the processing to step S305.

In step S305, the detection determination unit 104 acquires information about a preset angle of view from the angle-of-view storage unit 105, and then, the angle-of-view adjustment apparatus 402 advances the processing to step S311. Processing operations which are performed in a case where the processing has proceeded from step S305 to step S311 and subsequent steps are similar to those in a case where the processing has proceeded from step S5 to step S10 and subsequent steps illustrated in FIG. 6 described above.

Moreover, in step S306, the human body detection unit 107 detects a human body with use of the image information acquired from the detection determination unit 104, and outputs coordinates of the detected human body and the image information to the coordinate conversion unit 108. After that, the angle-of-view adjustment apparatus 402 advances the processing to step S307.

In step S307, the coordinate conversion unit 108 converts intra-angle-of-view coordinates into PT coordinate values based on the coordinates of the human body and image information or the coordinates of the object and image information and the current PTZ values of the camera. Then, the coordinate conversion unit 108 outputs the PT coordinate values obtained by conversion to the coordinate storage unit 410. After that, the angle-of-view adjustment apparatus 402 advances the processing to step S308.

In step S308, the coordinate storage unit 410 stores the PT coordinate values acquired from the coordinate conversion unit 108. Then, the angle-of-view adjustment apparatus 402 advances the processing to step S309.

In step S309, the operation determination unit 416 determines whether a given period has elapsed by timer processing. If the result of determination in step S309 is true (YES in step S309), the operation determination unit 416 acquires information about the movement history of the human body in the given period, the PT coordinate values of the object, and the image information from the coordinate storage unit 410, and outputs them to the angle-of-view calculation unit 411. Then, the angle-of-view adjustment apparatus 402 advances the processing to step S310. On the other hand, if the result of determination in step S309 is false (NO in step S309), the operation determination unit 416 acquires image information from the coordinate storage unit 410, and outputs the image information to the image output unit 113. Then, the angle-of-view adjustment apparatus 402 advances the processing to step S312.

In step S310, the angle-of-view calculation unit 411 calculates an angle of view based on the PT coordinate values of the object, the image information, and the movement history information about the human body in the given period acquired from the coordinate storage unit 410. Thus, the angle-of-view calculation unit 411 calculates an angle of view in which the human body and the object are set, in consideration of the movement history of the human body in the given period. Additionally, the angle-of-view calculation unit 411 outputs information about the calculated angle of view to the angle-of-view operation unit 112. Then, the angle-of-view adjustment apparatus 402 advances the processing to step S311.

In step S311, the angle-of-view operation unit 112 performs an angle-of-view operation in such a way as to cause the human body and the object to be set in the angle of view in consideration of the movement history of the human body in the given period, based on information about the angle of view acquired from the angle-of-view calculation unit 411. Then, the angle-of-view adjustment apparatus 402 advances the processing to step S312.

In step S312, the image output unit 113 outputs the image information input from the angle-of-view operation unit 112 to the monitor apparatus 114. This causes a video image that is based on the image information to be displayed on the monitor apparatus 114. Then, the angle-of-view adjustment apparatus 402 advances the processing to step S313. In step S313, the angle-of-view adjustment apparatus 402 determines whether a stopping operation for the automatic image capturing processing has been performed by the automatic image capturing system on/off switch being operated, and, if the result of determination in step S313 is false (NO in step S313), the angle-of-view adjustment apparatus 402 returns the processing to step S301. On the other hand, if the result of determination in step S313 is true (YES in step S313), the angle-of-view adjustment apparatus 402 ends the processing illustrated in the flowchart of FIG. 20.

The angle-of-view adjustment apparatus 402 in the fourth exemplary embodiment previously converts intra-angle-of-view coordinates obtained by performing object detection into PT coordinate values and stores the PT coordinate values, and further stores the PT coordinate values of the human body also as movement history information. Then, the angle-of-view adjustment apparatus 402 performs adjustment in such a way as to bring about an angle of view in which the human body, which is likely to move, and the object are set, based on the movement history information about the human body in each given period and the PT coordinate values of the object. With this processing, according to the fourth exemplary embodiment, it is possible to continue setting the most recent region to which the human body has moved in the angle of view.

Figure 21:
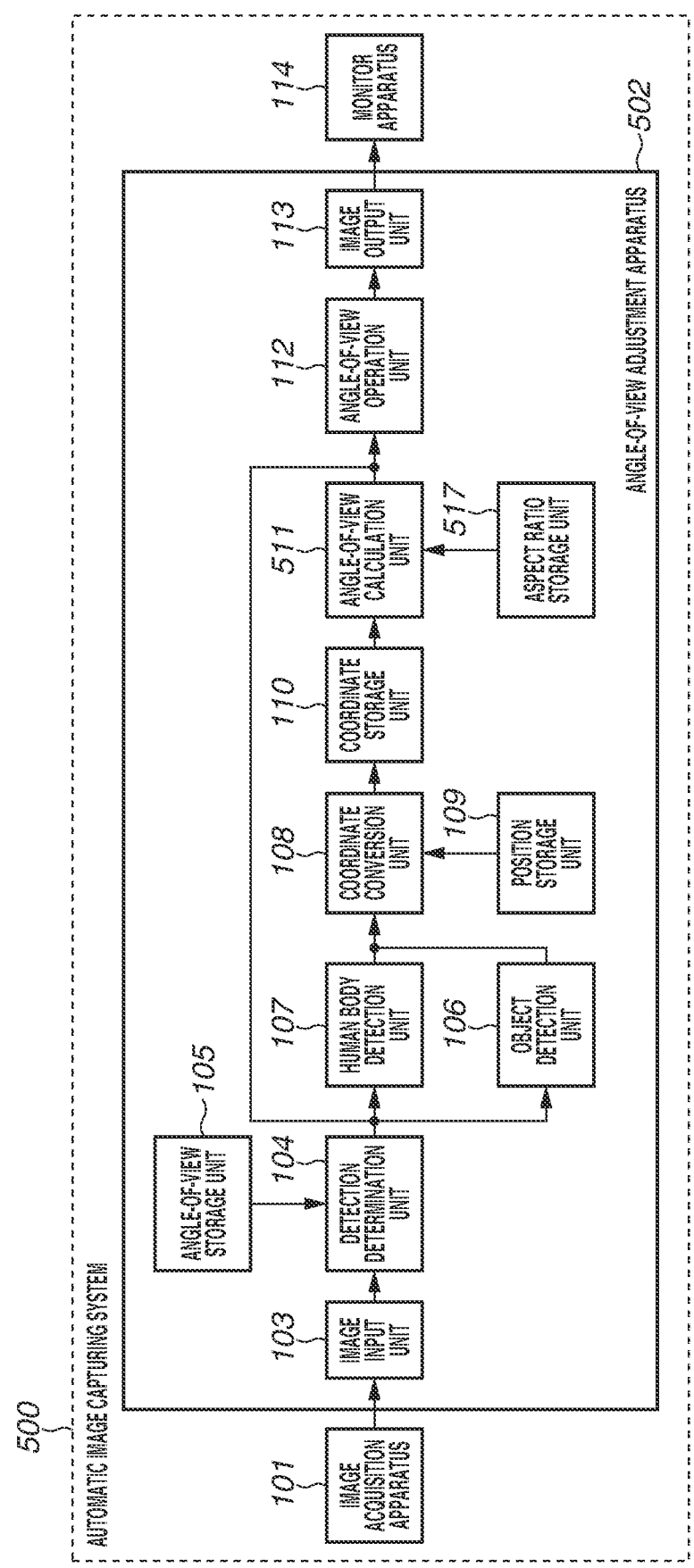
FIG. 21 is a block configuration diagram of an automatic image capturing system according to a fifth exemplary embodiment.

In the following description, a configuration example of an image capturing control apparatus according to a fifth exemplary embodiment is described with reference to FIG. 21. FIG. 21 is a block diagram illustrating a functional configuration of an automatic image capturing system 500 including an angle-of-view adjustment apparatus 502, which is an image capturing control apparatus according to the fifth exemplary embodiment. The automatic image capturing system 500 in the fifth exemplary embodiment includes an image acquisition apparatus 101, the angle-of-view adjustment apparatus 502, and a monitor apparatus 114. The angle-of-view adjustment apparatus 502 and the monitor apparatus 114 are interconnected via a video interface. Furthermore, even in the fifth exemplary embodiment, a use application of automatically performing image capturing of a scene in which an instructor is giving a lecture is assumed to be taken as an example.

The angle-of-view adjustment apparatus 502 in the fifth exemplary embodiment detects a human body and an object from a captured image, stores intra-angle-of-view coordinate values of the human body and the object as PT coordinate values, and, when performing angle-of-view calculation using the PT coordinate values, obtains an angle of view in consideration of an aspect ratio of the image. Thus, when calculating an angle of view in which a human body lying inside the angle of view and an object having lain outside the angle of view are set, the angle-of-view adjustment apparatus 502 in the fifth exemplary embodiment calculates an angle of view from which the human body and the object do not protrude in consideration of an aspect ratio of the image.

Upon receiving image information as an input from the image acquisition apparatus 101, the angle-of-view adjustment apparatus 502 in the fifth exemplary embodiment determines whether an object which is to be set in an angle of view has been detected, and, if the object has not been detected, the angle-of-view adjustment apparatus 502 adjusts the angle of view with use of a preset function and performs object detection using an image obtained by performing image capturing of the object. Moreover, the angle-of-view adjustment apparatus 502 converts intra-angle-of-view coordinates of the object obtained at that time into PT coordinate values using PTZ values of the camera, and stores the PT coordinate values. After that, the angle-of-view adjustment apparatus 502 detects a human body in the image, and converts intra-angle-of-view coordinates of the human body into PT coordinate values as with the object. When calculating an angle of view, the angle-of-view adjustment apparatus 502 in the fifth exemplary embodiment determines whether the human body or the object protrudes from the angle of view, based on a horizontal angle-of-view value calculated from the PT coordinate values of the human body and the object and a vertical angle-of-view value calculated from the aspect ratio. If the human body or the object protrudes from the angle of view, the angle-of-view adjustment apparatus 502 calculates a vertical angle-of-view value from the T coordinate values of the human body and the object, and calculates a horizontal angle-of-view value from the vertical angle-of-view value and the aspect ratio. Then, the angle-of-view adjustment apparatus 502 performs adjustment to the calculated angle of view, thus performing angle-of-view adjustment by calculating an angle of view in which to set the human body and the object. After that, the angle-of-view adjustment apparatus 502 outputs image information subjected to angle-of-view adjustment to the monitor apparatus 114.

In the angle-of-view adjustment apparatus 502, the image input unit 103, the detection determination unit 104, the angle-of-view storage unit 105, the object detection unit 106, the human body detection unit 107, the coordinate conversion unit 108, the position storage unit 109, the coordinate storage unit 110, the angle-of-view operation unit 112, and the image output unit 113 are similar to those described above. The angle-of-view adjustment apparatus 502 in the fifth exemplary embodiment differs in the processing operation performed in an angle-of-view calculation unit 511 and in that an aspect ratio storage unit 517 is further included from that in the first exemplary embodiment. In the following description, processing operations and configurations different from those in the first exemplary embodiment are described.

The angle-of-view calculation unit 511 calculates an angle of view from which the human body and the object do not protrude, with use of the PT coordinate values of the human body and the object and the image information input from the coordinate storage unit 110 and the image aspect ratio input from the aspect ratio storage unit 517. The aspect ratio storage unit 517 previously stores an image aspect ratio, and outputs information about the aspect ratio to the angle-of-view calculation unit 511.

Figure 22:
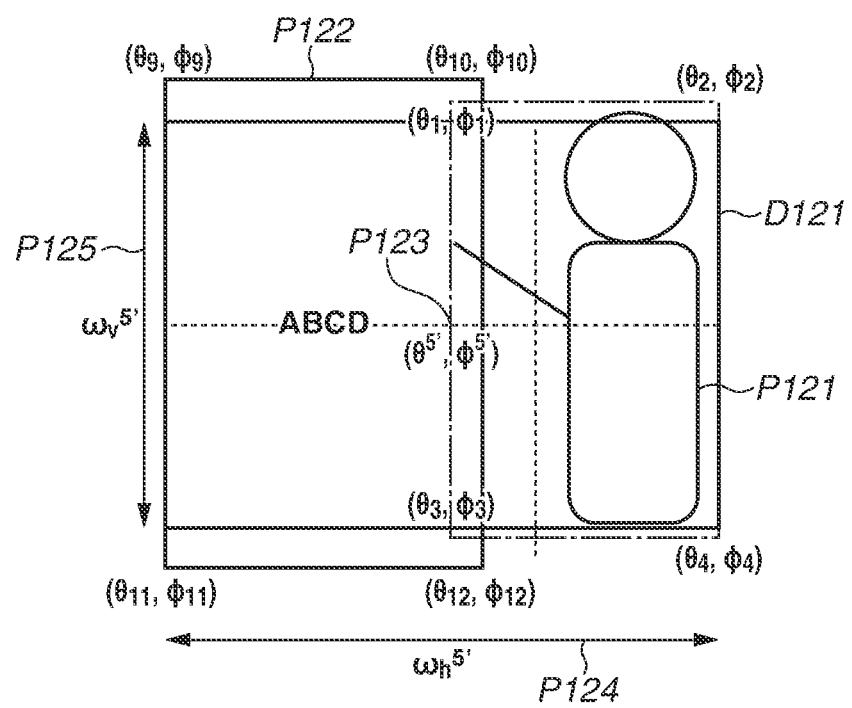
FIG. 22 is an explanatory diagram of an example of processing for calculating an angle of view based on P coordinates of a human body and an object.
Figure 23:
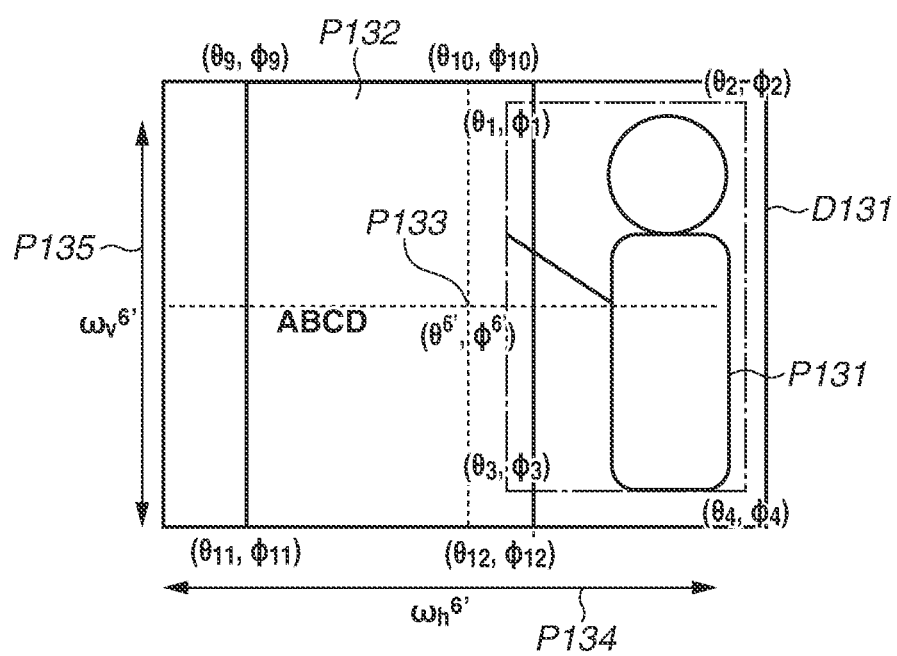
FIG. 23 is an explanatory diagram of an example of processing for calculating an angle of view based on T coordinates of a human body and an object.

FIG. 22 and FIG. 23 are diagrams used to explain the manner in which the angle-of-view calculation unit 511 in the fifth exemplary embodiment calculates an angle of view based on the PT coordinate values of the human body and the object, the image information, and the image aspect ratio. FIG. 22 illustrates a human body P121, an object P122, and the current angle of view D121. In the case of the example illustrated in FIG. 22, PT coordinate values of the rectangle representing the human body P121 are assumed to be represented by (θ1, Φ1), (θ2, Φ2), (θ3, Φ3), and (θ4, Φ4) in order of an upper-left vertex, an upper-right vertex, a lower-left vertex, and a lower-right vertex of the rectangle. Moreover, PT coordinate values of the rectangle representing the object P122 are assumed to be represented by (θ9, Φ9), (θ10, Φ10), (θ11, Φ11), and (θ12, Φ12) in order of an upper-left vertex, an upper-right vertex, a lower-left vertex, and a lower-right vertex of the rectangle. Moreover, in FIG. 22, PT coordinate values of the center P123 in the angle of view D121, angle-of-view ends of which correspond to ends of the human body P121 and ends of the object P122 are assumed to be (θ5', Φ5'), and the horizontal angle-of-view value P124 is assumed to be ωh5'. Here, the P coordinate value θ5' of the center P123 of the angle of view can be calculated as an average value of P coordinate values of the human body P121 and the object P122, as expressed by formula (15).

$$\theta 5'=(\max(\theta 1,\theta 2,\theta 9,\theta 10)+\min(\theta 1,\theta 2,\theta 9,\theta 10))/2 \quad (15)$$

Moreover, the T coordinate value Φ5' of the center P123 of the angle of view can be calculated as an average value of the T coordinate value of the human body P121 and the T coordinate value of the object P122, as expressed by formula (16).

$$\Phi 5'=(\max(\Phi 1,\Phi 2,\Phi 9,\Phi 10)+\min(\Phi 1,\Phi 2,\Phi 9,\Phi 10))/2 \quad (16)$$

Moreover, the horizontal angle-of-view value ωh5' can be calculated as a difference value between the P coordinate values of the human body P121 and the object P122, as expressed by formula (17).

$$\omega h5'=\max(\theta 1,\theta 2,\theta 9,\theta 10)-\min(\theta 1,\theta 2,\theta 9,\theta 10)) \quad (17)$$

Moreover, when the vertical angle-of-view value P125 is assumed to be ωv5', the vertical angle-of-view value ωv5' can be calculated from the horizontal angle-of-view value ωh5' and the image aspect ratio, as expressed by formula (18). Here, the image aspect ratio is assumed to be 4:3 (angle-of-view vertical width:angle-of-view horizontal width), but is not limited to this ratio and can be any ratio such as 16:9.

$$\omega v5'=2\tan^{-1}((3/4)\tan((1/2)\omega h5')) \quad (18)$$

The angle of view D121 illustrated in FIG. 22 is an angle of view determined based on the PT coordinate values (θ5', Φ5') of the center P123, the horizontal angle-of-view value ωh5', and the vertical angle-of-view value ωv5' described above. Here, in the fifth exemplary embodiment, the angle-of-view calculation unit 511 determines whether the human body or the object does not protrude from the angle of view when the vertical width of the angle of view is the vertical angle-of-view value ωv5', by using the following formula (19).

$$(\Phi 5'-(1/2)\omega v5')>\min(\Phi 1,\Phi 2,\Phi 9,\Phi 10) \text{ or } (\Phi 5'+(1/2)\omega v5')<\max(\Phi 1,\Phi 2,\Phi 9,\Phi 10) \quad (19)$$

Then, since, if this condition is satisfied, the human body or the object protrudes from the angle of view, the angle-of-view calculation unit 511 calculates the horizontal angle-of-view value from the image aspect ratio based on the vertical angle-of-view value. FIG. 23 is a diagram used to explain the manner in which the angle-of-view calculation unit 511 calculates the horizontal angle-of-view value from the image aspect ratio based on the vertical angle-of-view value.

In FIG. 23, a human body P131 is the same as the human body P121 illustrated in FIG. 22, and an object P132 is the same as the object P122 illustrated in FIG. 22. Moreover, the center P133 is the same as the center P123 illustrated in FIG. 22. Thus, when PT coordinate values of the center P133 are denoted by (θ6′, Φ6′), the PT coordinate values (θ6′, Φ6′) are the same as the PT coordinate values (θ5′, Φ5′) of the center P123 illustrated in FIG. 22, as expressed by formula (20).

$$\theta6'=\theta5' \quad \Phi6'=\Phi5' \tag{20}$$

Moreover, when the vertical angle-of-view value P135 is denoted by ωv6′, the vertical angle-of-view value ωv6′ can be calculated as a difference value between the T coordinate values of the human body P131 and the object P132, as expressed by formula (21).

$$\omega v6'=(\max(\Phi1,\Phi2,\Phi9,\Phi10)-\min(\Phi1,\Phi2,\Phi9,\Phi10)) \tag{21}$$

Moreover, when the horizontal angle-of-view value P134 is denoted by ωh6′, the horizontal angle-of-view value ωh6′ can be calculated from the vertical angle-of-view value ωv6′ and the image aspect ratio, as expressed by formula (22).

$$\omega h6'=2\tan^{-1}((3/4)\tan((1/2)\omega v6')) \tag{22}$$

The angle-of-view calculation unit 511 calculates an angle of view from which, as illustrated in FIG. 23, the human body and the object do not protrude, in the above-described way, and outputs information about the calculated angle of view to the angle-of-view operation unit 112.

Figure 24:
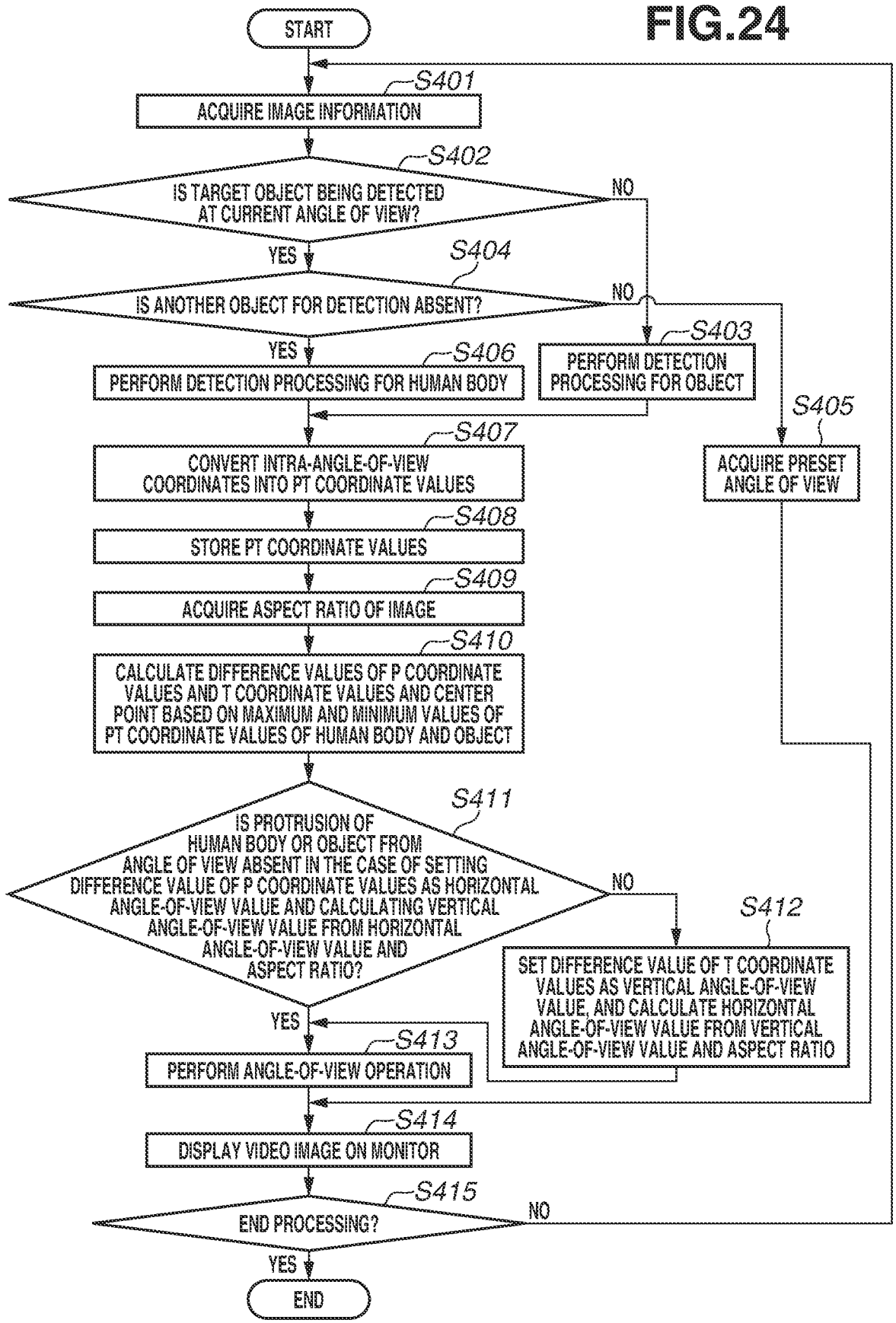
FIG. 24 is a flowchart of angle-of-view adjustment processing according to the fifth exemplary embodiment.

FIG. 24 is a flowchart particularly illustrating the flow of angle-of-view adjustment processing which the angle-of-view adjustment apparatus 502 performs out of processing operations related to the automatic image capturing system 500 according to the fifth exemplary embodiment. Upon receiving an instruction for startup issued by a user operation, the automatic image capturing system 500 starts processing for automatic image capturing.

First, in step S401, the image input unit 103 of the angle-of-view adjustment apparatus 502 acquires image information from the image acquisition apparatus 101. Next, in step S402, the detection determination unit 104 determines whether an object serving as a target subject which is to be set in the angle of view is being detected with use of the image information input from the image input unit 103. If the result of determination in step S402 is true (YES in step S402), the detection determination unit 104 advances the processing to step S404. On the other hand, if the result of determination in step S402 is false (NO in step S402), the detection determination unit 104 outputs the image information to the object detection unit 106. After that, the angle-of-view adjustment apparatus 502 advances the processing to step S403.

In step S403, the object detection unit 106 performs object detection processing with use of the image information input from the detection determination unit 104, and outputs coordinates of the detected object and the image information to the coordinate conversion unit 108. Then, the angle-of-view adjustment apparatus 502 advances the processing to step S407.

In step S404, the detection determination unit 104 determines whether another object targeted for detection is absent, with use of information indicating whether a preset angle of view acquired from the angle-of-view storage unit 105 has been used. If the result of determination in step S404 is true (YES in step S404), the detection determination unit 104 outputs the image information to the human body detection unit 107, and then, the angle-of-view adjustment apparatus 502 advances the processing to step S406. On the other hand, if the result of determination in step S404 is false (NO in step S404), the detection determination unit 104 advances the processing to step S405.

In step S405, the detection determination unit 104 acquires information about a preset angle of view from the angle-of-view storage unit 105, and then, the angle-of-view adjustment apparatus 502 advances the processing to step S414. In a case where the processing has proceeded from step S405 to step S414, the image output unit 113 outputs the image information input from the angle-of-view operation unit 112 to the monitor apparatus 114. This causes a video image that is based on the image information to be displayed on the monitor apparatus 114. Then, the angle-of-view adjustment apparatus 502 advances the processing to step S415.

Moreover, in step S406, the human body detection unit 107 detects a human body with use of the image information acquired from the detection determination unit 104, and outputs coordinates of the detected human body and the image information to the coordinate conversion unit 108. Then, the angle-of-view adjustment apparatus 502 advances the processing to step S407.

In step S407, the coordinate conversion unit 108 converts intra-angle-of-view coordinates into PT coordinate values based on the coordinates of the human body and image information or the coordinates of the object and image information and the current PTZ values of the camera. Then, the coordinate conversion unit 108 outputs the PT coordinate values obtained by conversion to the coordinate storage unit 410. After that, the angle-of-view adjustment apparatus 502 advances the processing to step S408. In step S408, the coordinate storage unit 110 stores the PT coordinate values acquired from the coordinate conversion unit 108. Then, the angle-of-view adjustment apparatus 502 advances the processing to step S409.

In step S409, the aspect ratio storage unit 517 acquires an aspect ratio of the image from the camera and stores the acquired aspect ratio. Then, the angle-of-view adjustment apparatus 502 advances the processing to step S410. In step S410, the angle-of-view calculation unit 511 calculates difference values between the P coordinate values and the T coordinate values and the center point based on the maximum values and minimum values of the PT coordinate values of the human body and the object, and sets the calculated center point as the center of the angle of view.

Next, in step S411, the angle-of-view calculation unit 511 sets the difference value of the P coordinate values as a horizontal angle-of-view value, and, moreover, acquires information about the image aspect ratio from the aspect ratio storage unit 517. Then, the angle-of-view calculation unit 511 determines whether, in the case of calculating a vertical angle-of-view value from the horizontal angle-of-view value and the image aspect ratio, any protrusion of the human body or the object from the angle of view is absent. If the result of determination in step S411 is true (YES in step S411), the angle-of-view calculation unit 511 advances the processing to step S413, and, on the other hand, if the result of determination in step S411 is false (NO in step S411), the angle-of-view calculation unit 511 advances the processing to step S412.

In step S412, the angle-of-view calculation unit 511 sets the difference value of the T coordinate values as a vertical angle-of-view value, and calculates a horizontal angle-of-view value from the vertical angle-of-view value and the image aspect ratio. Then, the angle-of-view adjustment apparatus 502 advances the processing to step S413.

In step S413, the angle-of-view operation unit 112 performs an angle-of-view operation using the angle of view acquired from the angle-of-view calculation unit 511 in such a way as to set the human body and the object in the angle of view in consideration of the image aspect ratio. Then, the angle-of-view adjustment apparatus 502 advances the processing to step S414.

In step S414, the image output unit 113 outputs the image information input from the angle-of-view operation unit 112 to the monitor apparatus 114. This causes a video image that is based on the image information to be displayed on the monitor apparatus 114. Then, the angle-of-view adjustment apparatus 502 advances the processing to step S415. In step S415, the angle-of-view adjustment apparatus 502 determines whether a stopping operation for the automatic image capturing processing has been performed by the automatic image capturing system on/off switch being operated, and, if the result of determination in step S415 is false (NO in step S415), the angle-of-view adjustment apparatus 502 returns the processing to step S401. On the other hand, if the result of determination in step S415 is true (YES in step S415), the angle-of-view adjustment apparatus 502 ends the processing illustrated in the flowchart of FIG. 24.

When calculating an angle of view from the PT coordinate values, the angle-of-view adjustment apparatus 502 in the fifth exemplary embodiment calculates a horizontal angle-of-view value from the P coordinate values of the human body and the object, calculates a vertical angle-of-view value from the horizontal angle-of-view value and an image aspect ratio, and determines whether the human body and the object protrude from the angle of view. Then, in a case where the human body and the object protrude from the angle of view, the angle-of-view adjustment apparatus 502 calculates the vertical angle-of-view value from the T coordinate values of the human body and the object, and adjusts the angle of view to an angle of view having the horizontal angle-of-view value calculated from the vertical angle-of-view value and the image aspect ratio. With this processing, according to the fifth exemplary embodiment, it becomes possible to continue setting the human body and the object in the angle of view.

While several exemplary embodiments of the present disclosure have been described above, the present disclosure is not limited to the described exemplary embodiments, and can be modified or altered in various fashions within the range of the gist thereof. For example, in the first exemplary embodiment, when performing angle-of-view calculation, the angle-of-view calculation unit 111 can be configured to calculate a vertical angle-of-view value from the T coordinate values of the human body and the object and calculate a horizontal angle-of-view value from the vertical angle-of-view value and an image aspect ratio. Moreover, any one of a configuration in which both the image acquisition apparatus and the angle-of-view adjustment apparatus are included in a single apparatus and a configuration in which the image acquisition apparatus and the angle-of-view adjustment apparatus are included in the respective different apparatuses can be employed. Additionally, the angle-of-view adjustment apparatus can be implemented by application software.

Figure 25:
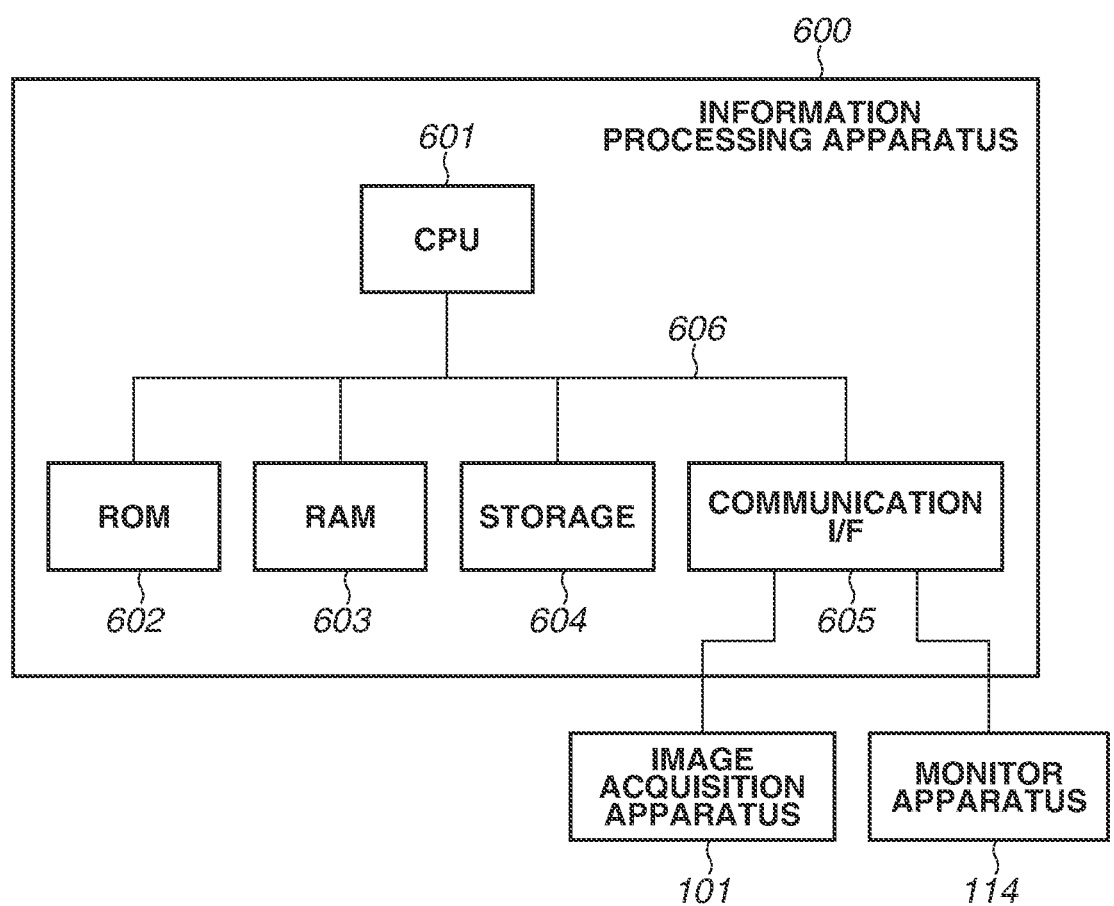
FIG. 25 is a diagram illustrating a hardware configuration example of an angle-of-view adjustment apparatus.

FIG. 25 is a diagram illustrating an example of a hardware configuration of an information processing apparatus 600 in a case where the angle-of-view adjustment apparatus described in each of the first to fifth exemplary embodiments is implemented with application software. Furthermore, in FIG. 25, the image acquisition apparatus 101 and the monitor apparatus 114, which are connected to the information processing apparatus 600 (angle-of-view adjustment apparatus), are also illustrated.

The information processing apparatus 600 includes a central processing unit (CPU) 601, a read-only memory (ROM) 602, a random access memory (RAM) 603, a storage 604, and a communication interface (I/F) 605. These components are connected to an internal bus 606 and are configured to be able to communicate with each other. Moreover, the image acquisition apparatus 101 and the monitor apparatus 114, which are external apparatuses, are connected to the communication I/F 605.

The CPU 601 is a central processing unit which comprehensively controls operations to be performed in the information processing apparatus 600. The ROM 602 is anon-volatile memory which stores, for example, programs and various pieces of initial setting data required for the CPU 601 to perform processing operations. The RAM 603 is a volatile memory which functions as, for example, a main memory or work area for the CPU 601, and temporarily stores, for example, programs and image data. When performing processing, the CPU 601 loads, for example, a required program from the ROM 602 onto the RAM 603 and executes the loaded program to implement various functional operations.

The storage 604 is a high-capacity storage device as compared with the RAM 603, and is, for example, a hard disk drive (HDD) or a solid state drive (SSD). The storage 604 stores, for example, an operating system (OS) (basic software), which is executed by the CPU 601, an information processing program (application program) concerning processing to be performed by the angle-of-view adjustment apparatus described in each of the above-described exemplary embodiments, and various pieces of data. Moreover, the storage 604 is also able to store, for example, image data acquired via a network.

At the time of startup when, for example, the information processing apparatus 600 is powered on, the CPU 601 executes a boot program stored in the ROM 602. The boot program is used to read out the OS stored in the storage 604 and load the OS onto the RAM 603. After the OS is activated, upon receiving an execution start instruction from the user, the CPU 601 reads out an information processing program related to any one of the above-described exemplary embodiments from the storage 604 and loads the information processing program onto the RAM 603. This brings the CPU 601 into a state of being able to perform information processing related to any one of the above-described exemplary embodiments, i.e., angle-of-view adjustment processing. Moreover, the CPU 601 loads and stores various pieces of data for use in an operation of the information processing program related to each exemplary embodiment onto the RAM 603, and performs reading and writing of such data.

The communication I/F 605 performs communication with, for example, a network camera or another computer via a network. Furthermore, an image which is treated by the processing related to each exemplary embodiment, an information processing program for use in performing such processing, and various pieces of data for use in such processing can be acquired via a network. Moreover, the information processing apparatus 600 can be configured with a single apparatus, such as a personal computer (PC) or a tablet PC. However, the configuration of each exemplary embodiment can be configured with separate pieces of hardware or a combination of pieces of hardware.

The present disclosure can also be implemented by performing processing which provides a program for implementing one or more functions of the above-described exemplary embodiments to a system or apparatus via a network or a storage medium and causes one or more processors included in a computer of the system or apparatus to read out and execute the program. Moreover, the present disclosure can also be implemented by using a circuit which implements such one or more functions (for example, an application specific integrated circuit (ASIC)). Each of the above-described exemplary embodiments is merely a specific example in embodying the present disclosure, and should not be construed to limit the technical scope of the present disclosure. Thus, the present disclosure can be embodied in various fashions without departing from the technical idea thereof or the principal feature thereof.

According to the above-described exemplary embodiments, it becomes possible to acquire an angle of view in which a target subject lying inside the angle of view and a target subject having lain outside the angle of view are set, thus obtaining an image including such target subjects.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-157729 filed Sep. 18, 2020, which is hereby incorporated by reference herein in its entirety.

What is claimed is:

1. An image capturing control apparatus comprising:
one or more memories having instructions stored therein; and
one or more processors that, upon execution of the stored instructions; configures the apparatus to:
detect a first target subject from an image captured by an image capturing unit in a state of a first angle of view of the image capturing unit;
detect a second target subject from an image captured by the image capturing unit in a state of a second angle of view of the image capturing unit;
convert intra-angle-of-view coordinates of each of the first target subject in the first angle of view and the second target subject in the second angle of view into a pan coordinate value and a tilt coordinate value;
store the pan coordinate value and the tilt coordinate value of each of the first target subject and the second target subject;
determine an angle of view so as to include the first target subject and the second target subject based on the stored pan coordinate value and the stored tilt coordinate value of each of the first target subject and the second target subject, even if a current angle of view of the imaging unit does not include at least one of the first target subject and the second target subject; and
control an angle of view of the image capturing unit based on the determined angle of view.

2. The image capturing control apparatus according to claim 1, wherein execution of the stored instructions further configures the apparatus to extract a region of interest from an image captured by the image capturing unit,
wherein an angle of view so as to include the first target subject and the region of interest is determined.

3. The image capturing control apparatus according to claim 2, wherein the region of interest is extracted from the second target subject.

4. The image capturing control apparatus according to claim 2, wherein execution of the stored instructions further configures the apparatus to determine the angle of view such that the first target subject does not lie at edge of the angle of view and the region of interest lies at edge of the angle of view.

5. The image capturing control apparatus according to claim 4, wherein execution of the stored instructions further configures the apparatus to slide the determined angle of view which has been determined so as to include the first target subject and the second target subject, such that the region of interest lies at edge of an angle of view, thus determining the angle of view such that the first target subject does not lie at edge of an angle of view end and the region of interest lies at edge of an angle of view.

6. The image capturing control apparatus according to claim 2, wherein the region of interest is extracted based on luminance information in an image captured by the image capturing unit.

7. The image capturing control apparatus according to claim 1, wherein execution of the stored instructions further configures the apparatus to determine the angle of view such that a distance from the first target subject to edge of an angle of view has room corresponding to a width of the first target subject.

8. The image capturing control apparatus according to claim 1, wherein execution of the stored instructions further configures the apparatus to determine the angle of view so as to include the first target subject and the second target subject, based on a movement history of the first target subject in a given period.

9. The image capturing control apparatus according to claim 8,
wherein the movement history of the first target subject includes a plurality of a pan coordinate value and a tilt coordinate value of the first target subject obtained in the given period.

10. The image capturing control apparatus according to claim 1, wherein execution of the stored instructions further configures the apparatus to determine the angle of view so as to include the first target subject and the second target subject, further based on an aspect ratio of an image captured by the imaging unit.

11. The image capturing control apparatus according to claim 10, wherein execution of the stored instructions further configures the apparatus to determine, based on the aspect ratio, whether the first target subject and the second target subject protrude from a current angle of view, and, when it is determined that the first target subject and the second target subject protrude from the current angle of view, an angle of view from which the first target subject and the second target subject do not protrude is determined.

12. The image capturing control apparatus according to claim 1, wherein the determined angle of view includes an entire region of the first target subject and an entire region of the second target subject.

13. An image capturing control method to be performed by an image capturing control apparatus which controls an image capturing unit, the image capturing control method comprising:
detecting a first target subject from an image captured by the image capturing unit in a state of a first angle of view of the image capturing unit;
detecting a second target subject from an image captured by the image capturing unit in a state of a second angle of view of the image capturing unit;
converting intra-angle-of-view coordinates of each of the first target subject in the first angle of view and the second target subject in the second angle of view into a pan coordinate value and a tilt coordinate value;
storing the pan coordinate value and the tilt coordinate value of each of the first target subject and the second target subject;
determining an angle of view so as to include the first target subject and the second target subject based on the stored pan coordinate value and the stored tilt coordinate value of each of the first target subject and the second target subject, even if a current angle of view of the imaging unit does not include at least one of the first target subject and the second target subject; and
controlling an angle of view of the image capturing unit based on the determined angle of view.

14. A non-transitory computer-readable storage medium storing computer-executable instructions that, when executed by a computer, cause the computer to perform an image capturing control method for controlling an image capturing unit, the image capturing control method comprising:
detecting a first target subject from an image captured by the image capturing unit in a state of a first angle of view of the image capturing unit;
detecting a second target subject from an image captured by the image capturing unit in a state of a second angle of view of the image capturing unit;
converting intra-angle-of-view coordinates of each of the first target subject in the first angle of view and the second target subject in the second angle of view into a pan coordinate value and a tilt coordinate value;
storing the pan coordinate value and the tilt coordinate value of each of the first target subject and the second target subject;
determining an angle of view so as to include the first target subject and the second target subject based on the stored pan coordinate value and the stored tilt coordinate value of each of the first target subject and the second target subject, even if a current angle of view of the imaging unit does not include at least one of the first target subject and the second target subject; and
controlling an angle of view of the image capturing unit based on the determined angle of view.

* * * * *